US012412709B2

(12) United States Patent
Bacher et al.

(10) Patent No.: US 12,412,709 B2
(45) Date of Patent: Sep. 9, 2025

(54) SWITCH DISCONNECTOR FOR MANUALLY SWITCHING A NUMBER OF ELECTRICAL CONTACTS

(71) Applicant: Eaton Intelligent Power Limited, Dublin (IE)

(72) Inventors: Frank Bacher, Schönbrunn (DE); Frank Hieronymus, Mudau (DE); Marco Knab, Eberbach (DE); Toni Ott, Neckargemund (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 373 days.

(21) Appl. No.: 17/293,410

(22) PCT Filed: Nov. 8, 2019

(86) PCT No.: PCT/EP2019/025394
§ 371 (c)(1),
(2) Date: May 12, 2021

(87) PCT Pub. No.: WO2020/098970
PCT Pub. Date: May 22, 2020

(65) Prior Publication Data

US 2022/0005652 A1 Jan. 6, 2022

(30) Foreign Application Priority Data

Nov. 12, 2018 (DE) ..................... 10 2018 219 224.3

(51) Int. Cl.

| | |
|---|---|
| ***H01H 9/00*** | (2006.01) |
| ***H01H 1/20*** | (2006.01) |
| ***H01H 19/06*** | (2006.01) |
| ***H01H 19/635*** | (2006.01) |
| ***H01H 71/02*** | (2006.01) |

(52) U.S. Cl.
CPC ............ *H01H 9/0066* (2013.01); *H01H 1/20* (2013.01); *H01H 19/06* (2013.01); *H01H 19/6355* (2013.01); *H01H 71/0271* (2013.01)

(58) Field of Classification Search
CPC ........ H01H 9/0066; H01H 1/20; H01H 19/06; H01H 19/6355; H01H 71/0271;
(Continued)

(56) References Cited

U.S. PATENT DOCUMENTS 3,238,329 A 3/1966 Russo
4,335,288 A 6/1982 Ludwig et al.
(Continued)

FOREIGN PATENT DOCUMENTS

CN 108780985 A 11/2018
DE 19743601 A1 8/1998
(Continued)

OTHER PUBLICATIONS

International Search Report for PCT Application No. PCT/EP2019/025394, Feb. 5, 2020, 2 pages, Netherlands.
(Continued)

*Primary Examiner* — Lheiren Mae A Caroc
(74) *Attorney, Agent, or Firm* — Stinson LLP

(57) ABSTRACT

The invention relates to a switch having a switch housing, a number of module-type individual interrupter chambers which can be arranged in particular side by side in the switch housing and having at least two switching contact elements, and an actuating device which closes off the switch housing above the individual interrupter chambers. This actuating device serves to adjust a cam element for the selective establishment of an electrical connection between the switching contact elements of an individual interrupter chamber. The switching contact elements can be arranged in at least two different orientations in each individual inter-
(Continued)

rupter chamber in an explosion-protected manner. Furthermore, in particular the cam element of the actuating device can be arranged differently depending on the orientation of the switching contact elements. This results in a switch with a simple adaptation option for housing installation or front-panel mounting, wherein all requirements for explosion protection are also fulfilled at the same time.

19 Claims, 27 Drawing Sheets

(58) Field of Classification Search
CPC ....... H01H 11/0031; H01H 2071/0278; H01H 2011/0037; H01H 9/042; H01H 9/00; H01H 19/635; H01H 71/02
See application file for complete search history.

(56) References Cited

U.S. PATENT DOCUMENTS

| | | | | |
|---|---|---|---|---|
| 4,713,498 | A | 12/1987 | Ludwig et al. | |
| 5,200,057 | A | 4/1993 | Canaris | |
| 5,299,957 | A | 4/1994 | Schaeffer | |
| 6,072,128 | A * | 6/2000 | Ansorge | H01H 11/0012 200/18 |
| 6,576,851 | B1 * | 6/2003 | Barlian | H01H 3/40 200/18 |
| 8,222,546 | B2 * | 7/2012 | Leischner | H01H 71/0235 200/11 R |
| 2010/0258413 | A1 | 10/2010 | Ludwig et al. | |

FOREIGN PATENT DOCUMENTS

| | | | |
|---|---|---|---|
| DE | 4440554 | B4 | 1/2007 |
| FR | 2622734 | A1 | 5/1989 |
| FR | 2949017 | A3 | 2/2011 |
| GB | 9415966 | A | 2/1996 |

OTHER PUBLICATIONS

United Arab Emirates Examination Report and Search Report for Application No. P6000777/2021, Oct. 10, 2024, 9 pages.

* cited by examiner

SWITCH DISCONNECTOR FOR MANUALLY SWITCHING A NUMBER OF ELECTRICAL CONTACTS

CROSS-REFERENCE TO RELATED APPLICATION

This application is a 371 of international PCT Serial No. PCT/EP2019/025394, filed Nov. 8, 2019, which claims the benefit of German Serial No. 102018219224.3, filed Nov. 12, 2018, the entire contents of which are incorporated herein by reference.

FIELD

The invention relates to a switch, usually an electrical switch, which serves, for example, as a main switch, in particular as a switch disconnector, for manually switching a number of electrical contacts. In a specific design, the switch is formed as a rotary switch, with a conversion of a rotational movement of the rotary switch into a linear movement. A cam element of the rotary switch carries a series of cams which, depending on the adjustment of the cam element, move counter-contact elements between the contact position and the disconnected position.

BACKGROUND

DE 44 40 554 B4 describes a switch which has a base plate on which at least one cam disk, which is coupled to a switching shaft, is rotatably mounted for one switching element in each case. Between each cam disk and the actuating shaft, a driver disk is connected; this can be coupled in different positions to the cam disk in a rotationally fixed manner.

A ganged cam switch with several individual interrupter chambers arranged side by side is known, for example, from DE 10 2008 004 747 B3. Each individual interrupter chamber contains at least two switching contact elements, which can be electrically connected to each other via corresponding counter-contact elements. The ganged cam switch has a switch housing, in which a number of such modular individual interrupter chambers, which can be arranged in particular side by side in the switching housing, are contained. Above the individual interrupter chambers, the switch housing is closed off by an actuating device for adjusting the corresponding cam element. Through a corresponding adjustment of the cam element, an electrical connection can be established selectively between the switching contacts of an individual interrupter chamber via the corresponding counter-contact elements.

In the case of the known switches, it has been found to be disadvantageous that a corresponding expandability of the switch and a variable alignment and arrangement of the switch is not possible at all or is possible only with considerable effort.

SUMMARY

The object of the invention is therefore to improve a switch of the type mentioned at the outset in such a way that an extension or a modified arrangement and in particular an adaptation to the housing installation or front-panel mounting is possible in a simple manner. At the same time, it should also be possible for all explosion protection requirements to be met.

This object is achieved by the features of claim 1. The invention is characterized in particular in that the switching contact elements can be arranged within the switch housing in at least two different orientations and in that the cam element of the actuating device can be arranged differently depending on the orientation of the switching contact elements. These options make it possible to adapt to a housing or ceiling installation in a simple manner. For example, due to the different arrangability of the cam element, the actuating device can be converted for left-hand or right-hand operation. At the same time, the arrangement of the switching contact elements (also called terminals) can be changed easily, so that, as a whole, a switch with particular variability and adaptability to installation results. Of course, the switching contact elements of the individual interrupter chambers can also be oriented in different ways.

After a corresponding installation of the individual interrupter chambers with elements located therein, in order to close off the switch housing securely, including with regard to explosion protection, each individual interrupter chamber can have a base plate connected in particular to the switch housing. After insertion of the individual interrupter chambers, this is fitted with corresponding internal parts for the purpose of closing off the individual interrupter chambers. A common base plate for a number of individual interrupter chambers is likewise conceivable. The connection can be made gas-tight and in particular welded to the corresponding switch housing.

In order to be able to connect the various switching contact elements to each other in a simple manner, the actuating device can have a rotary positioning drive which carries out a linear adjustment of the cam element, wherein the cam element has on a bottom side facing the switching contact elements a corresponding number of cams for moving counter-contact elements between the contact position and the disconnected position. In a corresponding disconnected position of the cam element, for example, the switching contact elements of an individual interrupter chamber are not electrically connected to each other, wherein, however, this can be realized for one or more of the other individual interrupter chambers. In this way, different individual interrupter chambers can be electrically conductively connected by correspondingly adjusting the cam element by means of the rotary positioning drive.

The structure and the variability of the switch is further simplified or elevated when each individual interrupter chamber has a contact element cover as a side wall, which can be connected to the individual interrupter chambers depending on the orientation of the switching contact elements. That is, the contact element cover can also be oriented differently depending on the orientation of the switching contact element, so that, for example, the corresponding orientation of the switching contact element can be recognized by the orientation of the contact element cover.

In order to simplify the design of the switch, it proves advantageous if all of the individual interrupter chambers are essentially of identical design and the contact element covers of all individual interrupter chambers are also of identical design.

For example, in order to connect such a contact element cover to the individual interrupter chamber in a simple manner, the contact element cover can be latched to the individual interrupter chamber.

The contact element cover can simultaneously serve for inserting a cable connection or the like from the outside in order to make connection with the switching contact element. In addition, it may prove advantageous if the contact element cover has a rounded supporting surface for a clamping screw of a contact element. The clamping screw serves to fix an electrical supply line or cable connection in the switching contact element and can be reached by an appropriate tool from outside the switch housing. Furthermore, it is advantageous if the clamping screws are also accessible from different orientations depending on the orientation of the switching contact elements.

To enable the introduction of a corresponding electrical line or a plug-in contact, the contact element cover can have a lateral insertion opening. This can additionally be used for arranging a plug-in identification plate for identifying the individual interrupter chamber.

The contact element can have a greater variability if it takes the form of a contact pin which, for example, is designed differently depending on what is required. In order to be able to arrange the contact pin as part of the contact element in a simple manner, the contact element can have a terminal with a receiving opening for an insertion end of the contact pin, which at its contact end opposite the insertion end is in contact with the counter-contact element in its contact position. In this case, the contact pin can, for example, be rectangular or the like at its insertion end, thereby enabling an anti-rotation function with respect to a correspondingly shaped receiving opening. In order to be able to provide a corresponding explosion protection via the contact pin, it can furthermore prove advantageous in this connection for the contact pin to have a gap cylinder in an approximately central position, between which and an edge of the receiving opening a flameproof gap is formed. That is, the corresponding diameter of the gap cylinder is, as a rule, the same as the diameter of the receiving opening, so that the gap cylinder rests around the receiving opening at the corresponding edge and a gap is formed there. Thereby, the gap has a length and gap width which delivers the desired explosion protection.

In order to be able to support the contact pin also in the direction of the terminal, it is conceivable that a bearing groove for longitudinally fixing the contact pin is formed between the gap cylinder and the contact end of the contact pin. This bearing groove accommodates a corresponding further part of the bearing housing or the individual interrupter chamber, so that, although the corresponding engagement permits a rotation of the contact pin, it is nevertheless fixed in the longitudinal direction.

In this connection, it can prove advantageous if the base plate has, in particular, two bearing clips projecting in the direction of the contact pin and engaging with their free ends in the bearing groove.

In order to improve engagement in this situation, the free end of the contact pin can take the form of an approximately U-shaped contact pin receptacle. This contact pin receptacle then engages in the corresponding bearing groove.

In order to enable the most precise fixing possible in the longitudinal direction of the contact pin, a material thickness of the bearing clip or of the corresponding contact pin receptacle can correspond to a bearing groove width.

The base plate can optionally also be used to support the counter-contact elements. This can be effected, for example, by the base plate having in an approximately central position a spring receiving opening for a spring element acting on the counter-contact element. The spring element is inserted, for example, with one end into this spring receiving opening, and with the other end supports a corresponding counter-contact element. It should be noted that such a counter-contact element can have, for example, two spaced-apart contacts which are in contact with the two switching contact elements of an individual interrupter chamber correspondingly in the contact position of the counter-contact element. This establishes the electrical connection between the two switching contact elements through the individual interrupter chamber.

A corresponding switch with a plurality of individual interrupter chambers has been described above. It is now possible to use even a plurality of these switches as main switches and optionally also to connect them to each other via corresponding side walls facing each other. It is also possible to use such a switch together with an auxiliary interrupter chamber which, for example, is attached to a side wall of the switch or which at least together with the switch is mounted on a rail or another location. Such an auxiliary interrupter chamber is a single part which can also be used without a switch. It is also true of the auxiliary interrupter chamber that it can be used both for housing installation and front-panel mounting. However, more than two switching contact elements are, as a rule, provided in the auxiliary interrupter chamber, i.e., for example, two or even more pairs of corresponding switching contact elements. The auxiliary interrupter chamber is of a similar design to an individual interrupter chamber of the aforementioned switch. However, if a plurality of contact pairs is used in an auxiliary interrupter chamber, they will be separated by a corresponding wall in order, for example, to realize explosion protection class Ex-e. The auxiliary interrupter chamber may be made of a corresponding plastic material or the like.

In particular, a corresponding auxiliary interrupter chamber has a side wall which can in particular be arranged laterally on the switch housing of the switch, the auxiliary interrupter chamber having at least two contact pairs of corresponding switching contact elements.

The auxiliary interrupter chamber can be actuated in a different way, since a corresponding coupling to the actuating device of the switch is not necessarily provided. For this purpose, the auxiliary interrupter chamber can have an outwardly projecting sliding-type actuating element. This can be displaced in the longitudinal direction against a corresponding spring force in order to, in this way, bring a corresponding counter-contact element into contact in each case with a pair of switching contact elements. That is, three different positions are, as a rule, conceivable with the auxiliary interrupter chamber, wherein in a first position no contact is made with the switching contact elements, while in the other two positions at least one contact is made with the respective pair of associated switching contact elements. The corresponding adjustment is effected here by means of the sliding-type actuating element. This can be connected to a plunger, on which the counter-contact element is embodied in the form of two contact elements projecting radially outwardly.

With regard to the auxiliary interrupter chamber, it should furthermore be noted that this has, for example, in particular two pairs of essentially L-shaped sliding arms which can be pushed onto push-on sections projecting laterally from the switch housing of the ganged cam switch and can be fixed in the pushed-on position by means of a latching projection. It is also conceivable for the arrangement of sliding arms and push-on sections to be effected in the reverse manner. In addition, corresponding devices can also be arranged between switch housings, for example, in order to connect the switch housings of a switch to each other.

The auxiliary interrupter chamber can realize the corresponding switching contact elements in a manner similar to that in the individual interrupter chambers. That is, such an auxiliary interrupter chamber can have on opposite sides two switching contact elements with corresponding contact pins. These have already been described in connection with the aforementioned individual interrupter chamber of the switch. The corresponding design of these elements also applies to the auxiliary interrupter chamber, and also conversely the further embodiments relating to the auxiliary interrupter chamber are transferable to the individual interrupter chambers of the switch.

That is, the auxiliary interrupter chamber can also have a base plate with bearing clips, wherein, in this connection, however, each bearing clip has two U-shaped contact pin receptacles, since the auxiliary interrupter chamber described has, for example, two pairs of switching contact elements with corresponding contact pins.

It has already been pointed out that, in order to provide Ex-e explosion protection, the two pairs of contacts should be separated, wherein, in this connection, this can be realized in that partition walls converging on each other are formed between the bearing clips. These separate the corresponding contact pairs from each other and also the two U-shaped contact pin receptacles.

Both the auxiliary interrupter chambers and the individual interrupter chambers are connected to their respective base plate. The connection is preferably of a gas-tight design, wherein this is effected, for example, by adhesive bonding and welding, in particular friction welding. In order not to lose the corresponding clamping screws in the switching contact elements, it may prove helpful if the side walls of the auxiliary interrupter chamber or individual interrupter chambers and their corresponding side walls have retaining projections in the region of the switching contact elements for holding such clamping screws of the switching contact elements. This makes it possible to screw the clamping screws to the switching contact elements in order to fasten the corresponding supply lines while at the same time preventing excessive loosening of the clamping screws and possible loss of the clamping screws.

In the simplest case, it is possible for the corresponding retaining projections to take the form of concavely curved edge projections which project inwardly in the direction of the screw head of the clamping screw and which partially overlap the screw head. That is, the clamping screw is unscrewed from the corresponding switching contact element until this contact between the edge projections and the screw head occurs.

It has already been pointed out that not only the switch housing[s], but also a switch housing and an auxiliary interrupter chamber, can be connected to each other. As a rule, this can be done in a favorable manner by means of essentially L-shaped push-on projections being formed, which projections project from at least one side wall and onto which the push-on arms, which are shaped in a substantially complementary manner, can be pushed. As a result, switch housings can be connected to each other via side walls facing each other without the aid of further tools, wherein this is likewise the case for a connection between the switch housing and the auxiliary interrupter chamber.

In this connection, in order to improve the connection between the parts, for example, two push-on projections or push-on arms can be arranged at a distance from each other in the height direction. This results in a double connection via an engagement in each case of the push-on arm and the push-on projection.

It has likewise already been pointed out that latching can take place simultaneously in the pushed-on position. This can be realized, for example, in that a latching projection is formed between the push-on projections and a latching arm is formed between the push-on arms, or vice versa.

There is also the possibility that the corresponding side walls of the switch housing and auxiliary switch chamber are of identical design, so that the connection cannot take place directly between them. Instead, a coupling frame part can be arranged between two adjacent switch housings and/or a switch housing and auxiliary switch chamber, which coupling frame part has corresponding push-on arms and/or latching arms on both sides. That is, a connection to, on the one hand, the switch housing and, on the other hand, a connection to an adjacent switch housing or to the auxiliary interrupter chamber takes place via this coupling frame part. In this connection, the corresponding devices of the switch housing and the auxiliary interrupter chamber can then be of the same design; i.e., they can be formed only from push-on projections and latching projections. The push-on arms or latching arms are then arranged on both sides of the coupling frame part.

There is the possibility that such a coupling frame part has two sides and corresponding connecting devices are provided on each side. It is likewise conceivable for the push-on arms or latching arms to extend essentially through the coupling frame part, so that push-on arms and latching arms are formed in one piece.

In order to prevent the screwing of the different parts, the coupling frame part is used, for example. If, in addition to the coupling frame part, there is possibly still a corresponding explosion protection between the parts, a partition plate can then be used which can be arranged, for example, between switch housings and/or switch housing and auxiliary contact chamber. This partition plate has an open inner contour, by means of which a connection between the switch housings and/or switch housing and auxiliary interrupter chamber is possible in the manner already described above. That is, the corresponding connecting means between switch housing and auxiliary interrupter chamber are not covered by the partition plate, but are instead exposed due to its inner contour.

The partition plate can be formed as an Ex-i partition and extend, in particular, beyond the contour of the switch housing and/or the auxiliary contact chamber at least laterally and/or upwardly.

A corresponding switch may include different numbers of individual interrupter chambers. The number of individual interrupter chambers depends on the size of the switch housing. For example, two, three, four or even more individual interrupter chambers can be arranged in a switch housing of a corresponding size. Correspondingly, the cam element is also formed to actuate the number of switching contact elements. It has already been pointed out that the actuating device can be oriented differently for left-handed and right-handed operation, while the other components of the switch housing have an identical design to the individual interrupter chambers. Furthermore, in each individual interrupter chamber, the corresponding switching contact elements can be arranged with a rotated orientation, in particular rotated by 180°. This makes it possible to adapt to housing installation or front-panel mounting in a simple manner. In addition, a simple coupling of, in particular, four-pole switches can be effected by a corresponding rotation of the actuating device. The actuating device has a fixed length and in the case of a three-pole switch covers the entire switch housing. In the case of a four-pole switch, the actuating device is mounted in an edge-locking manner, so that an individual interrupter chamber is not covered by the actuating element essentially on one side. If two four-pole switches are then coupled, an actuating device is rotated by 180°, so that both will be arranged on the associated sides of the adjacent switches in an edge-locking manner.

Essentially, the same switch is always used, but only with different orientations of its components. After corresponding assembly of the switch housing, this will be configured for the particular realization of the desired ignition protection class; see, for example, the welding of the base plate to each individual interrupter chamber or in the switch housing.

A corresponding flameproof gap is also realized in the switch according to the invention or in the corresponding auxiliary interrupter chamber; see the interaction of the gap cylinder and the receiving opening. As a rule, according to the invention no potting or gluing is carried out. A corresponding sealing of the interrupter chamber is effected by attaching the corresponding base plate, wherein welding and in particular friction welding is carried out in order to fasten the base plate. This applies both to the switch housing with the individual interrupter chambers and to the auxiliary interrupter chamber. The auxiliary interrupter chamber differs only in that, as a rule, at least two contact pairs are provided and the counter-contact element correspondingly makes a conductive connection with one of these pairs or separates both contact pairs from each other.

The invention also relates to corresponding devices for arranging the auxiliary interrupter chamber on the switch housing or also on switch housings. Of course, the corresponding parts, such as the switch, auxiliary interrupter chamber and partition plate or coupling frame part, can also be used independently of each other and can be used not only in combination with each other. In the following, advantageous exemplary embodiments of the invention are explained in more detail with reference to the figures appended in the drawing.

BRIEF DESCRIPTION OF THE DRAWINGS

Shown are.

DETAILED DESCRIPTION

Figure 1:
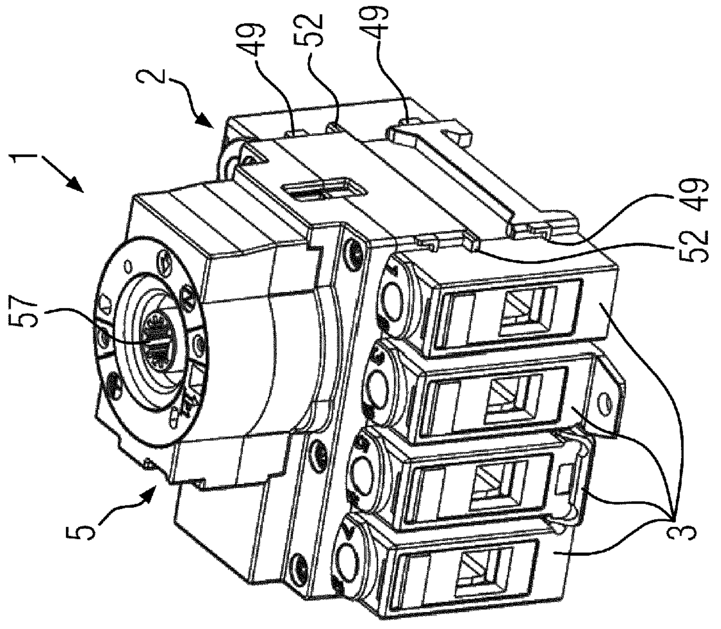
FIG. 1 a perspective oblique view of a switch according to the invention having four individual interrupter chambers.

FIG. 1 shows an exemplary embodiment of a switch 1 according to the invention. This has a switch housing 2 in which a number of individual interrupter chambers 3 are arranged. An actuating device 5 for the switch 1 is arranged on the top of the switch housing. This comprises a rotary positioning drive 57 in which, for example, a handle or the like for adjusting the rotary positioning drive can be used. The rotational movement of the rotary positioning drive 57 is converted into a linear adjustment of a bridge via a corresponding mechanism. On its underside 8 facing the individual interrupter chambers 3, this bridge has a contact surface; see also FIGS. 3 to 5. Depending on the position of the bridge 81, a corresponding plunger 61 is vertically adjusted and along with it a corresponding counter-contact element 9 in order to make contacts with switching contact elements 4 within each individual interrupter chamber 3. The individual interrupter chambers 3 are connected to each other and can consist of a single switch housing divided into chambers, wherein the chambers are closed off via a common base plate, or also in each case separately via a base plate individually closing off each chamber. On at least one corresponding side face of the switch housing 2, connecting elements in the form of, for example, L-shaped push-on projections 49 are arranged as sliding arms 35 (see also FIG. 13). Of these L-shaped push-on projections 49, two are arranged one above the other with a latching projection 52 between them. These serve for connecting different switch housings 2 to each other or also for attaching further parts; see the following embodiments.

Figure 2:
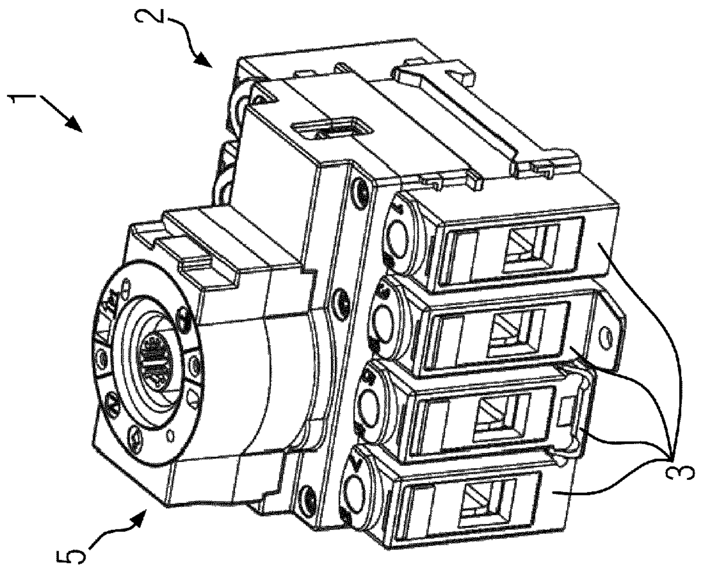
FIG. 2 a view analogous to FIG. 1 with a 180° rotated arrangement of an actuating device.

In FIG. 1, the actuating device 5 is arranged in a specific orientation, while in FIG. 2 the orientation is rotated by 180° exactly. The remaining parts of the switch housing as well as the individual interrupter chambers 3 are arranged in the same way in both exemplary embodiments according to FIGS. 1 and 2. Due to the different orientation of the actuating device 5 according to FIGS. 1 and 2, these two four-pole switches can also be combined in their assembly (in this regard, see FIG. 20).

Figure 3:
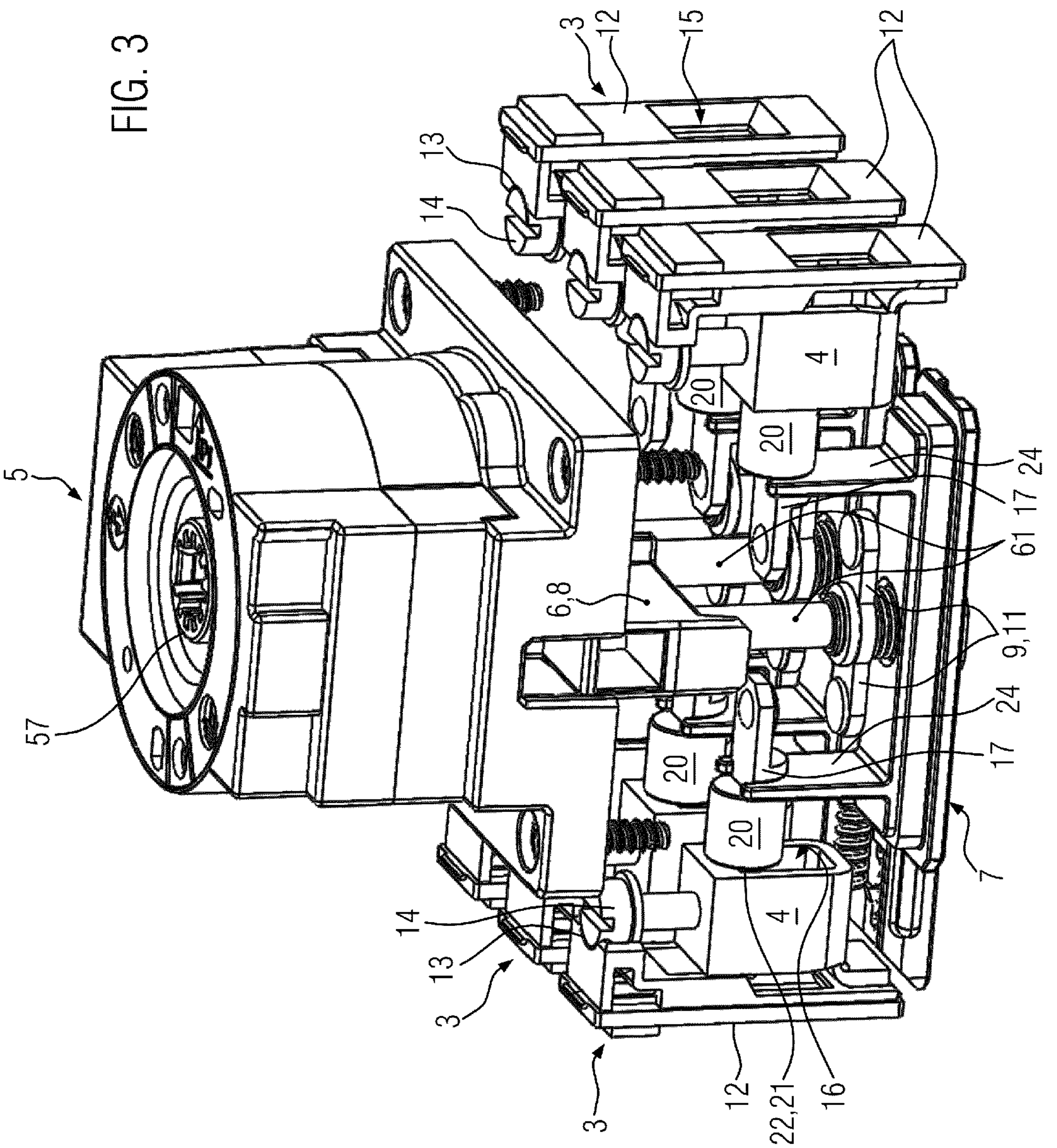
FIG. 3 a switch according to FIG. 1 without a switch housing.

FIG. 3 shows a corresponding switch 1 according to FIGS. 1 and 2 in a partially exploded view but without a corresponding switch housing 2. These adjust corresponding plungers 61 in the vertical direction along with corresponding counter-contact elements; see in particular the disconnected position 11 according to FIG. 3, in which the counter-contact element 9 is separated from contact pins 17 as part of the switching contact elements 4. Each individual interrupter chamber 3 has a base plate 7 as well as two mutually opposing switching contact elements 4. According to the invention, such an individual interrupter chamber 3 is furthermore closed off by contact element covers 12. The corresponding base plate 7 is inserted from below into the individual interrupter chambers 3 and is fastened there for example by friction welding. The corresponding contact element covers 12 can be latched onto the switch housing 2 (in this regard, see also FIG. 6). A corresponding contact element cover 12 has a lateral insertion opening 15 for inserting cable connections or the like, which can then be fastened in each switching contact element 4 by means of a clamping screw 14. The corresponding cable connection is fixed by the clamping screw 14 in a receiving opening 16 by means of the corresponding contact pin 17 (in this regard, see also FIG. 10). The contact pins 17 are supported from below by corresponding bearing clips 24 of the base plate 7 so that, although they are rotatable, they are fixed in terms of longitudinal displacement. A gap cylinder 20 of the contact pin 17 is arranged between the base plate 7 and the receiving opening 16. This forms a puncture-proof gap 22 with a corresponding edge 21 of the receiving opening 16.

Via the lateral insertion openings 15 of each contact element cover 12, a corresponding cable or the like is inserted in the direction of the switching contact element 4 into each individual interrupter chamber 3.

When the counter-contact element 9 is in contact with the two mutually opposing switching contact elements 4, these will be connected electrically in order, for example, to provide a voltage to a corresponding device.

The plungers 61 are spring-loaded in the direction of the actuating device 5. Via cams of a corresponding cam element 6 (see FIGS. 4 and 5), the corresponding plunger 61 can, via the bridge 81, be pressed down in the direction of the base plate 7 against the spring force. When the cam element 6 is rotated correspondingly, the spring application will be able to move the plunger 61 upwards until it comes into contact with the corresponding contact pin 17.

Figure 5:
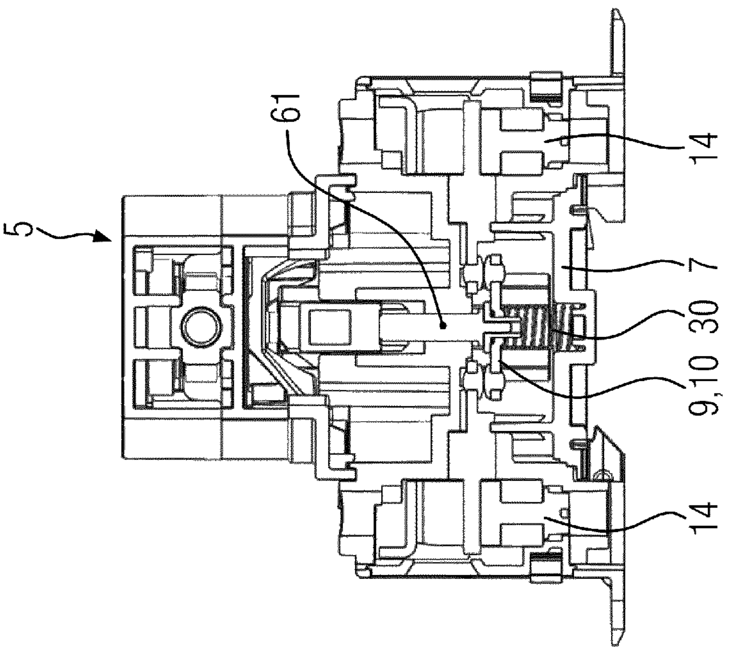
FIGS. 4 and 5 a sectional view of the switch according to the invention with differently oriented switching contact elements.
Figure 4:
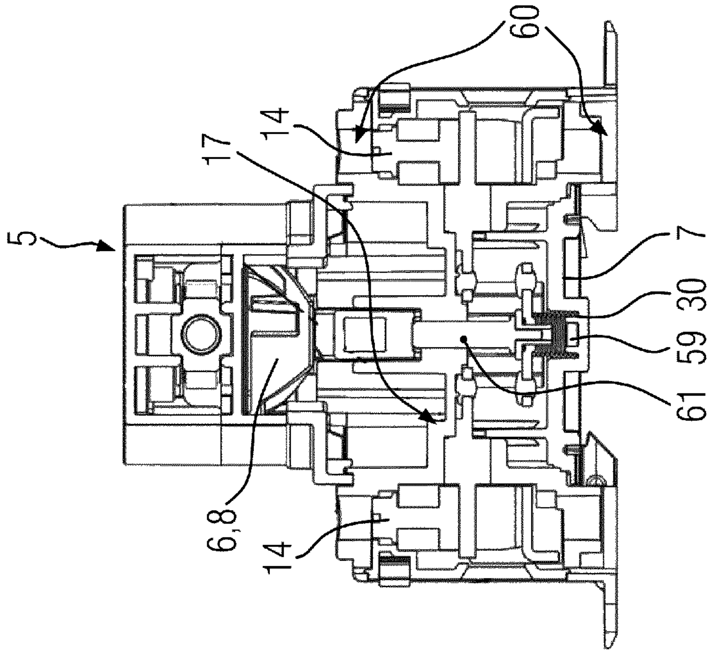

FIGS. 4 and 5 show a representation analogous to FIG. 3 for different positions of the plunger 61. In FIG. 4, the corresponding plunger 61 is deflected downwards against the spring action of a spring element 30, so that the corresponding counter-contact element 9 (see also FIG. 3) is arranged in its disconnected position 11 with regard to corresponding switching contact elements 4. On the other hand, in FIG. 5 the counter-contact element 9 is in its contact position 10 with the corresponding switching contact elements 4, so that an electrical connection is established between the two mutually opposing switching contact elements of the corresponding individual interrupter chamber 3.

In the FIGS. 4 and 5, it can be seen in particular that the switching contact elements 4 and in particular the terminal 66 can be arranged in two different orientations in the corresponding individual interrupter chamber. While in FIG. 4 the corresponding clamping screw 14 is accessible from above and the contact element cover 12 is also correspondingly arranged, in FIG. 5 an arrangement of the clamp 66 is rotated by 180°. As a result, the clamping screw 14 is accessible from below, i.e. from sides of the base plate 7, wherein the contact element cover 12 is also arranged in a manner rotated by 180°. This is possible according to the invention without further changes to the ganged cam switch 1. Both a housing installation and a front-panel mounting can thereby be realized. Corresponding openings 60 are provided in the individual interrupter chambers 3 or also in the switch housing 2, for allowing access to the clamping screws 14.

Figure 6:
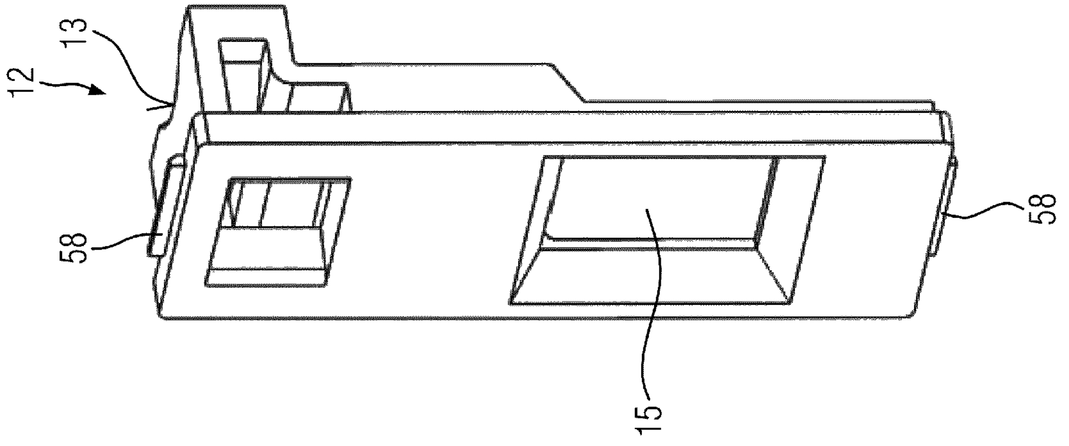
FIG. 6 a perspective side view of a side wall of an individual interrupter chamber.

In FIG. 6, a corresponding lateral contact element cover 12 is shown enlarged and on its own. This has tabs 58 at the top and bottom ends for latching to the individual interrupter chamber 3 or the switch housing 2. In the lower half of the contact element cover 12, the lateral insertion opening 15 is formed, via which a corresponding cable connection can be introduced in the direction of switching contact elements 4. A plug-in identification plate 80 for identification of the individual interrupter chamber can be arranged in the upper region of the contact element cover.

As described in connection with FIGS. 4 and 5, the contact element cover 12 can likewise be arranged in two orientations depending on the arrangement of the switching contact elements 4. On its side projecting inwardly in the direction of the individual interrupter chamber 3, the contact element cover 12 has a supporting surface 13 which laterally supports a clamping screw 14 (see also FIG. 3), wherein at the same time the supporting surface 13 can have an inwardly projecting projection for captively holding the clamping screw 14 (see also the other embodiments). In other words, the clamping screw 14 is held by the corresponding projection of the support surface 13 and is captively arranged in the individual interrupter chamber 3.

Figure 7:
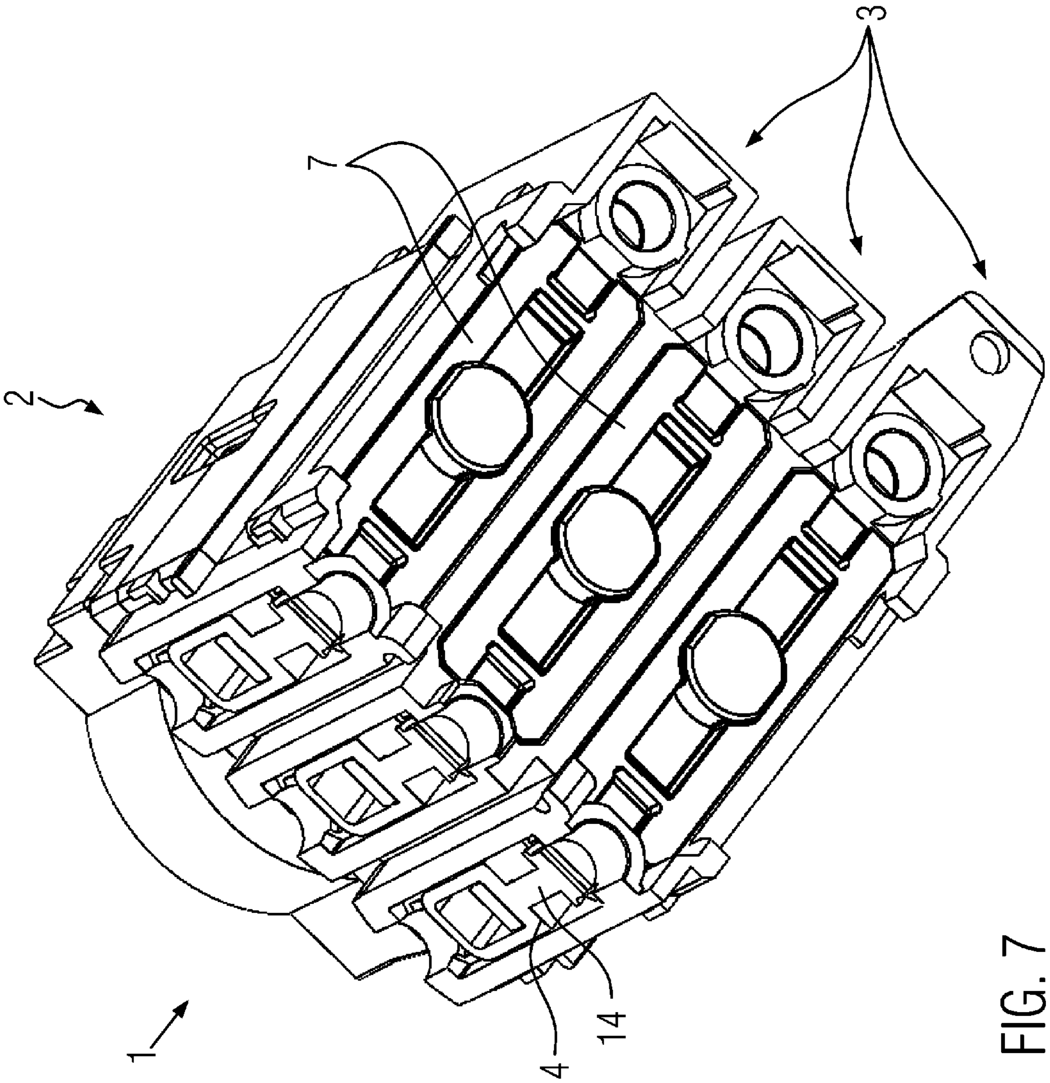
FIG. 7 a perspective view obliquely from below of a switch according to the present invention with a base plate.

FIG. 7 shows a perspective view of the underside of a corresponding switch 1. In this case, the switching contact elements 4 are partially cut, with the corresponding clamping screws 14 facing downwards toward the bottom plates 7. This applies analogously to both sides of the corresponding individual interrupter chambers 3. The underside of each individual interrupter chamber 3 is closed off by the base plate 7. This results in an explosion-proof arrangement of the switching contact elements 4 in the switch 1.

Figure 8:
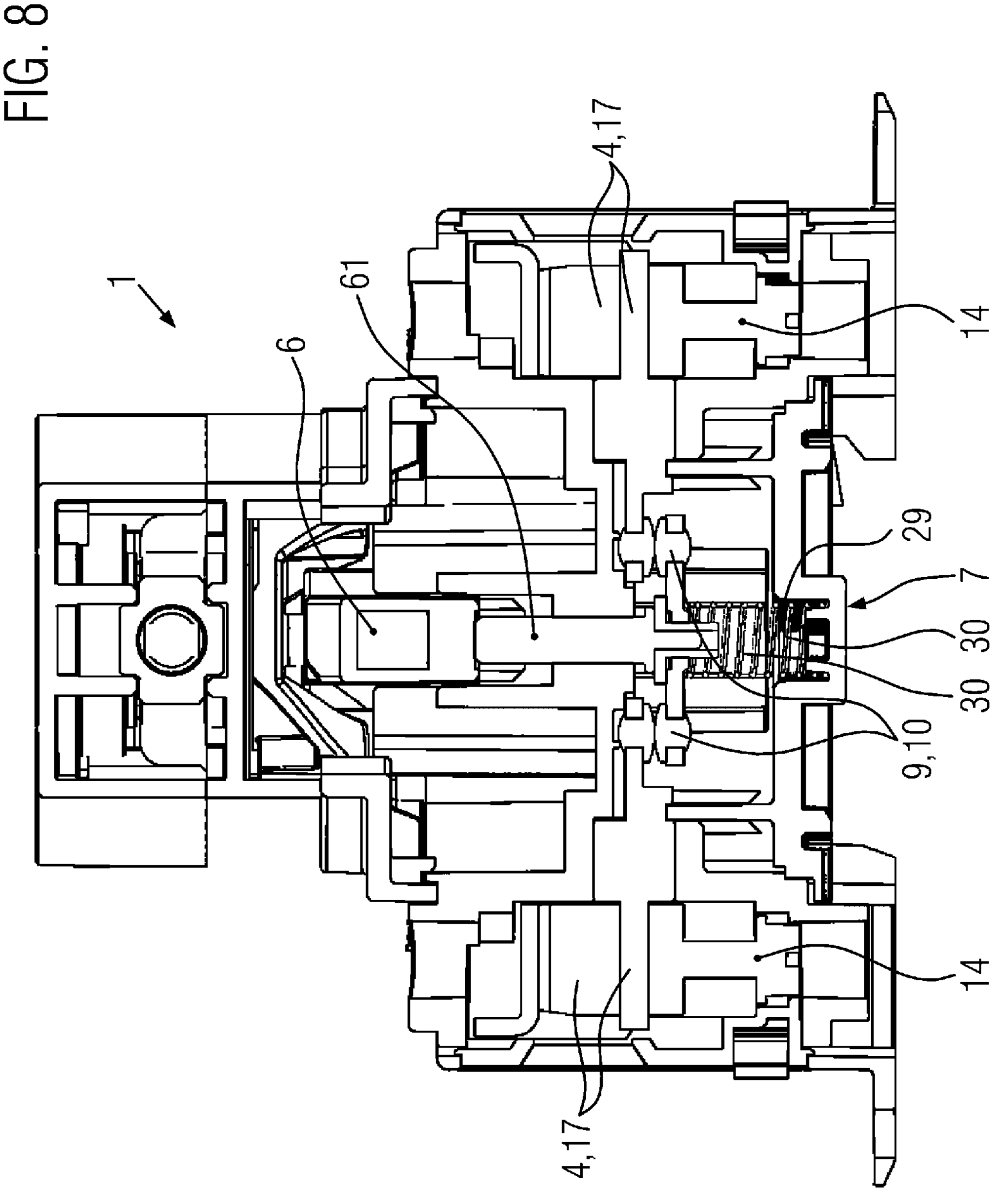
FIG. 8 a sectional view of a switch with counter-contact element in the contact position.

In FIG. 8, a vertical section through the switch 1 is shown. In this representation, the plungers 61 are arranged by a corresponding arrangement of the cam element 6 in such a way that the counter-contact element 9 is in electrical contact with the switch contact elements 4 on both sides. In other words, the corresponding plunger 61 or the counter-contact element 9 is arranged in its contact position 10. Furthermore, it can be seen in FIG. 8 that the base plate 7 has a corresponding receptacle for the spring element 30 (see spring receiving opening 29). According to FIG. 8, the switching contact elements 4 are arranged in such a way that the clamping screw 14 is accessible from below. Furthermore, it can be seen in FIG. 8 that corresponding openings 67 and 68 are formed above and below the corresponding switching contact element 4. Via these, the clamping screws 14 are accessible from above or below, depending on their arrangement.

Figure 9:
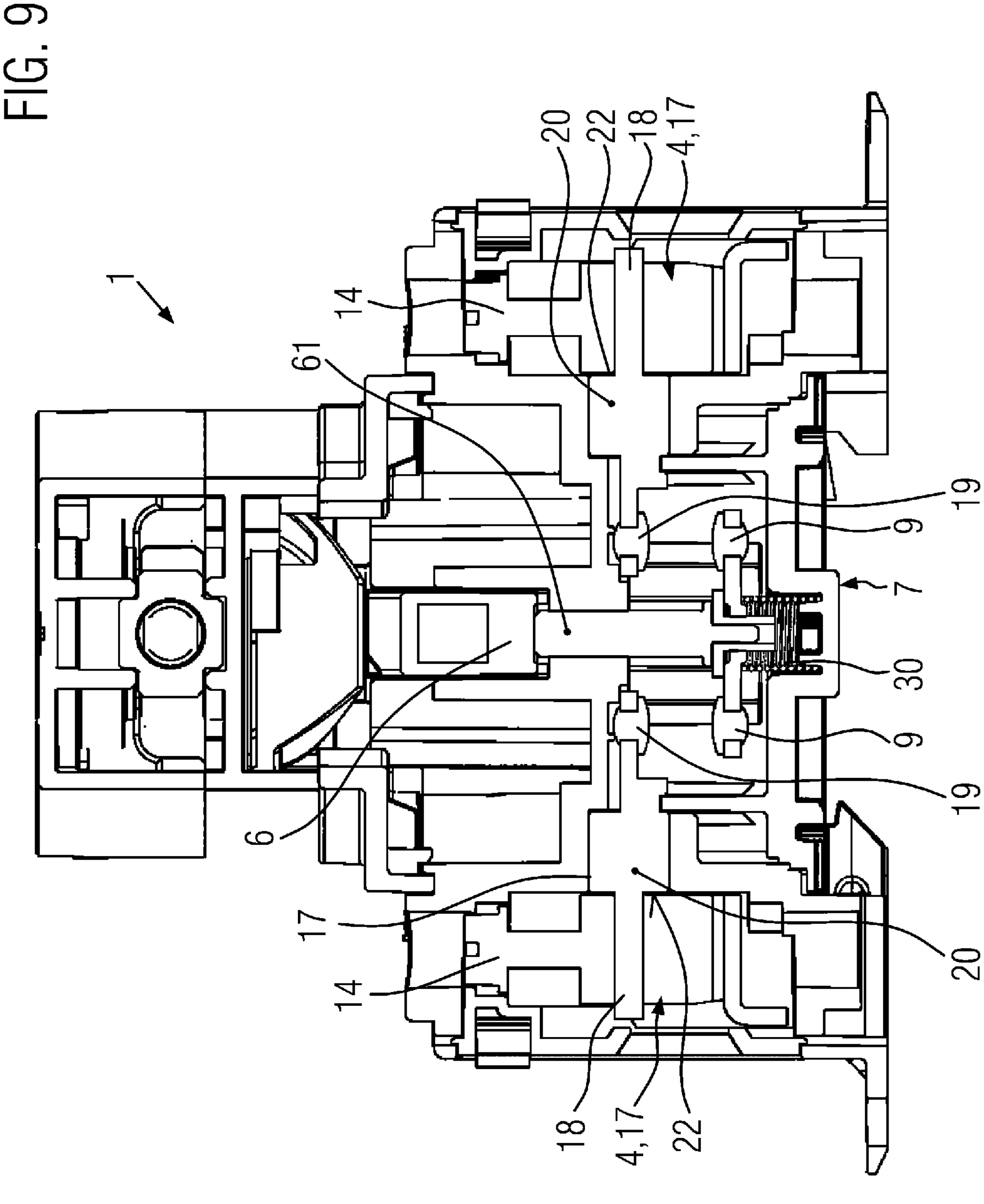
FIG. 9 a sectional view analogous to FIG. 8 with counter-contact element in the disconnected position.

As already explained above, an arrangement rotated by 180° of the switching contact elements 4 is possible. FIG. 9 shows such a different orientation of the switching contact elements 4. In this case, the clamping screws 14 are accessible from above, i.e. from the actuating device 5. In particular, it can also be seen in FIG. 9 that each switching contact element 4 has a contact pin 17. This extends from its insertion end 18 to its contact end 19. The contact end 19 serves to contact the counter-contact element 9 (see also FIG. 8). A puncture-proof gap 22 is formed between the corresponding opening edge 21 of the receiving opening 16 and the gap cylinder 20. In the arrangement of the plunger 61 according to FIG. 9, the corresponding spring element 30 is compressed downwardly in the direction of the base plate 7.

Figure 10:
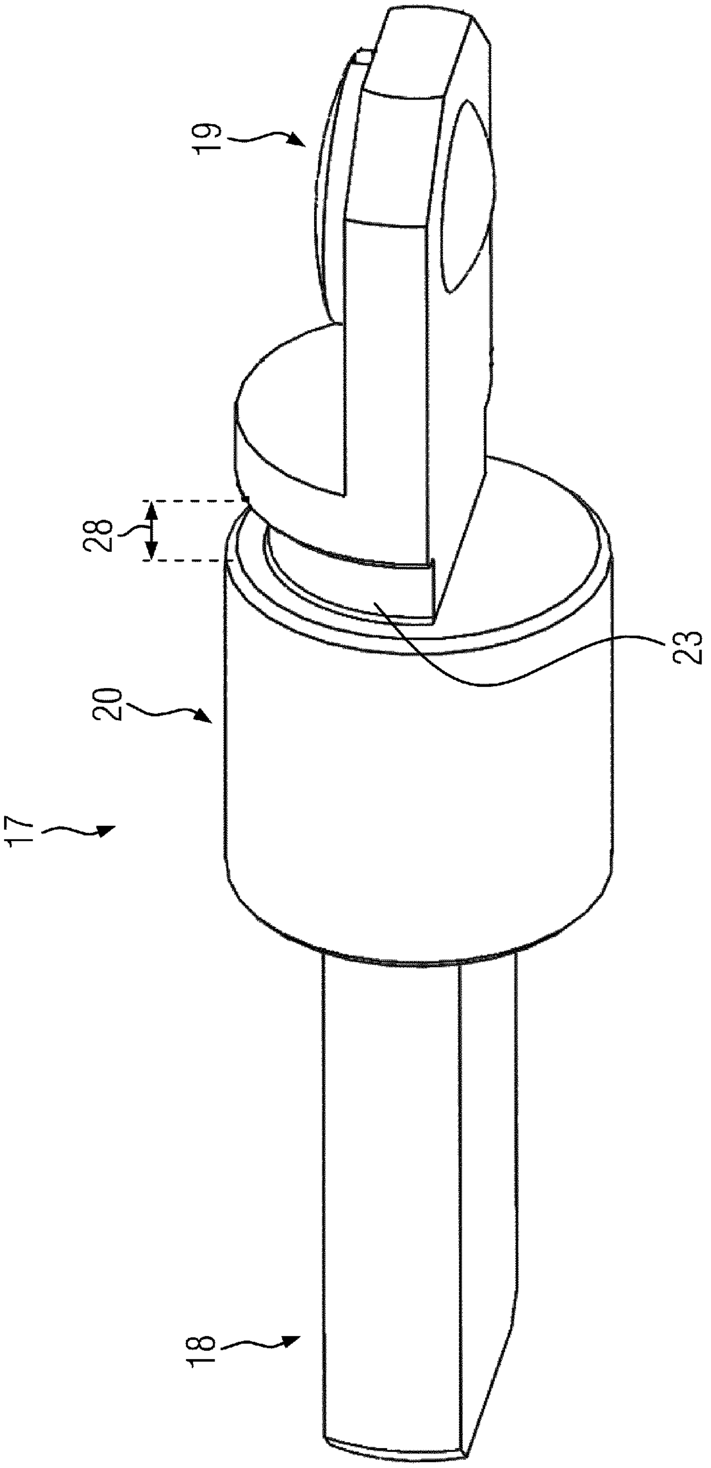
FIG. 10 a side perspective view of a contact pin.

In FIG. 10, the contact pin 17 is shown enlarged and without any other parts. The corresponding insertion end 18 is formed essentially by a rectangular portion of the contact pin 17. The gap cylinder 20 is attached to this insertion end 18. On the side of the gap cylinder 20 opposite the insertion end 18, the contact pin 17 has an approximately semicircular bearing groove 23. This serves for the rotatable, linearly non-displaceable mounting of the contact pin 17 with corresponding bearing clips 24 of the base plate 7 (see also FIGS. 11 and 12). The bearing groove 23 has a corresponding bearing groove width 28 which corresponds essentially to a material thickness 27 (see FIG. 11) of a bearing clip 24.

The contact pin 17 has its contact end 19 next to the bearing groove 23. This serves for contacting the counter-contact element in its contact position 10 (see also the preceding embodiments).

Figure 12:
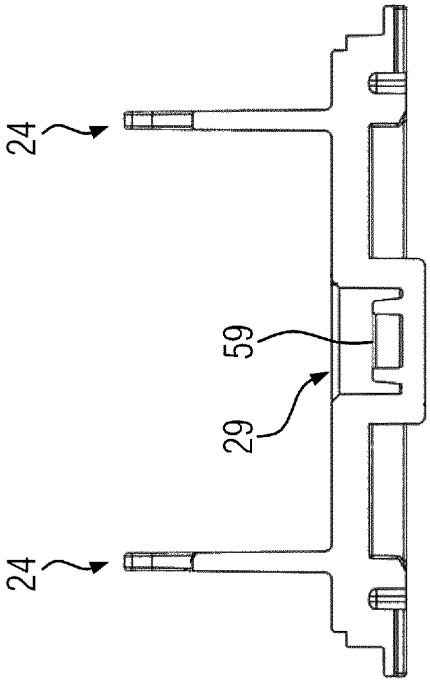
FIG. 12 a side sectional view of the bottom plate according to FIG. 11.
Figure 11:
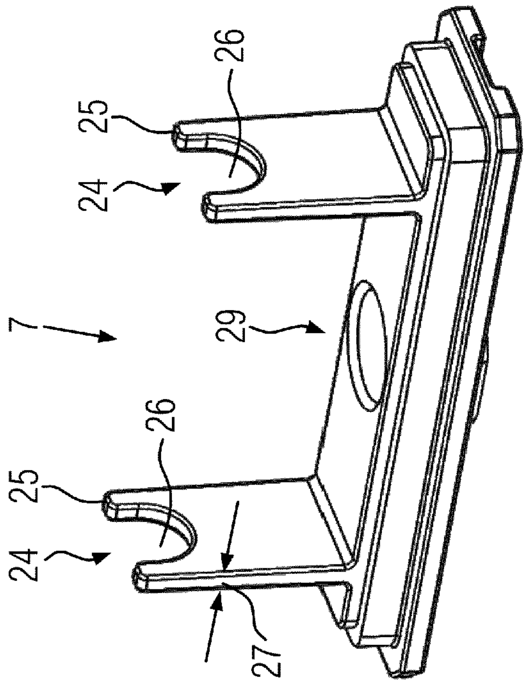
FIG. 11 a perspective side view of a base plate.

In FIGS. 11 and 12, the base plate 7 is shown on its own. This has, in an approximately central position, the spring receiving opening 29, which comprises a spring receptacle 59 for mounting a lower end of the spring element 30 (in this regard, see FIGS. 8 and 9).

The bearing clips 24 are arranged on both sides adjacent to the spring receiving opening 29. These extend upwardly in the direction of the contact pin and have approximately semicircular contact pin receptacles 26 at their free ends 25. These serve for receiving the corresponding bearing groove 23 (see also FIG. 10). The engagement of the contact pin receptacle 26 and the bearing groove 23 allows the contact pins 17 to be rotatable but non-displaceable in the longitudinal direction.

The switch 1 as shown so far has, for example, four individual interrupter chambers 3. This number of individual interrupter chambers 3 is only by way of example, wherein fewer or more individual interrupter chambers 3 can be arranged in a corresponding switch housing 2 of the switch 1.

Figure 13:
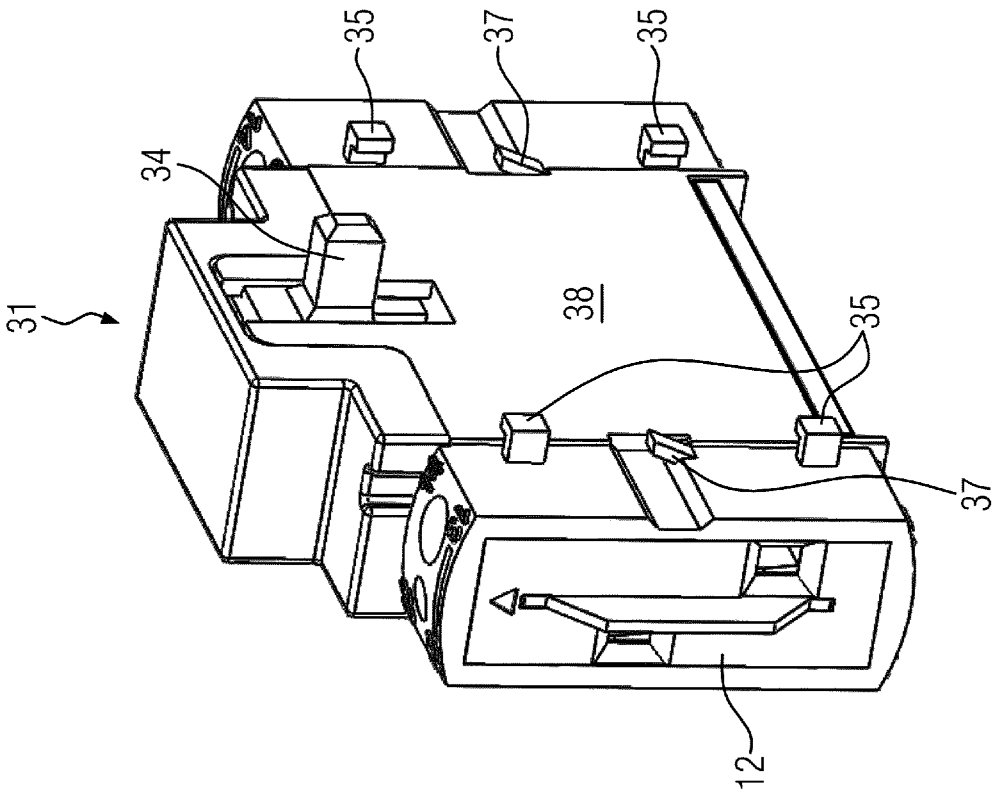
FIG. 13 a perspective side view of an auxiliary interrupter chamber.

In addition, it is possible to use an auxiliary interrupter chamber 31 as an independent part or also in interaction with the switch 1. This is shown in FIG. 13 in a lateral perspective view. For example, the auxiliary interrupter chamber 31 can be releasably secured to one side of a corresponding switch housing 2 of the ganged cam switch 1. The auxiliary interrupter chamber 31 has a sliding-type actuating element 34 by means of which, in the interior, a corresponding plunger is vertically movable in the switch in a manner analogous to the previous embodiments. In addition, the auxiliary interrupter chamber 31 has corresponding switching contact elements 4. However, the contact element covers 12 are formed to cover two switching contact elements 4 arranged side by side, so that in the exemplary embodiment of the auxiliary interrupter chamber 31 according to FIG. 13, two pairs of switching contact elements 4 are arranged therein (see also the following embodiments).

For fastening the auxiliary interrupter chambers 31 to the switch housing 2 or also for connecting a plurality of auxiliary interrupter chambers 31 to each other, the latter has at least on one side corresponding fastening elements (see L-shaped sliding arms 35 and locking projection 37). The sliding arms 35 form push-on projections 49 or push-on sections 36 (see also the remaining embodiments) onto which a corresponding push-on arm 50 can be pushed and then fastened by latching with the latching projection 37, 52 by means of a corresponding latching arm 53.

Figure 14:
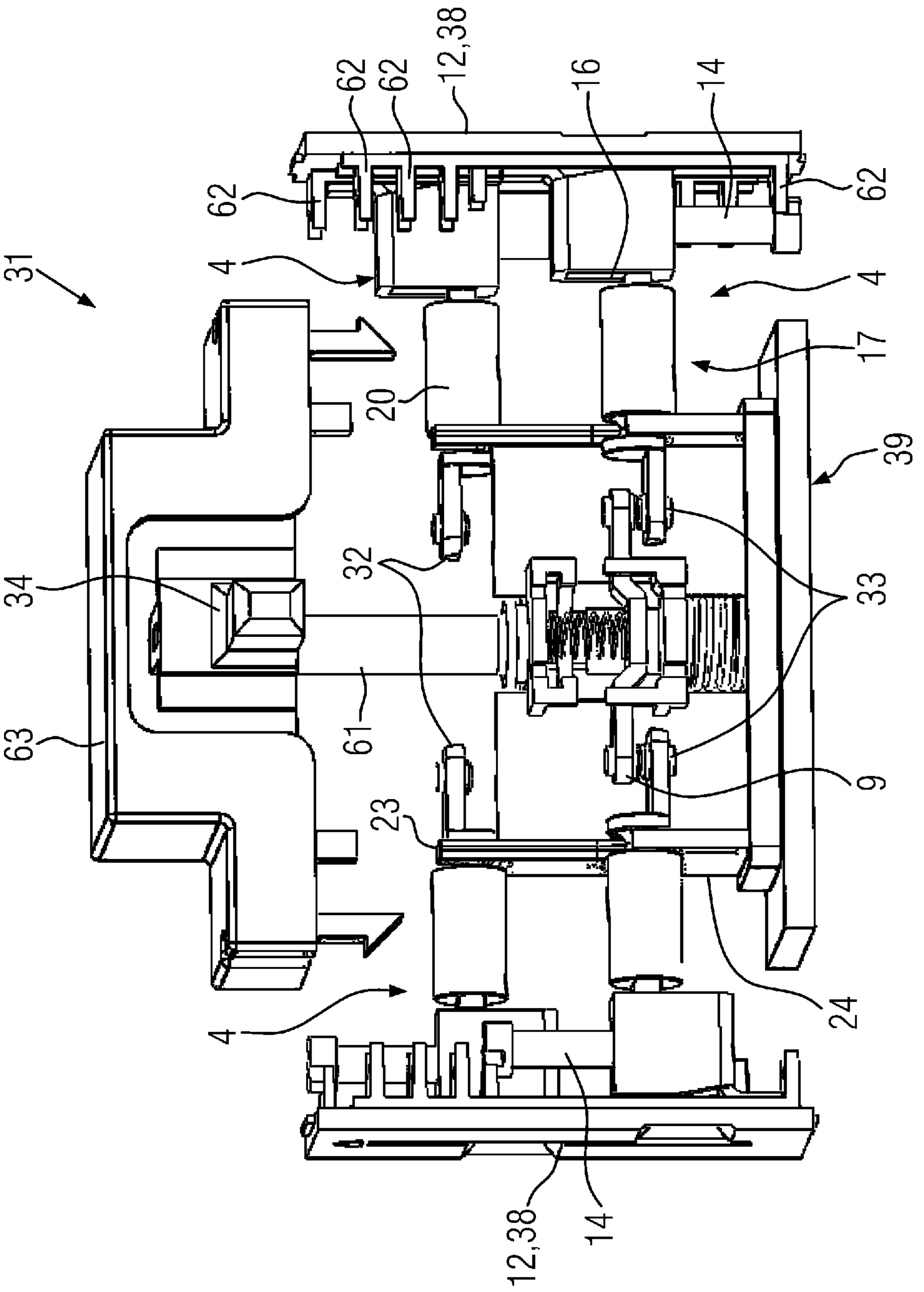
FIG. 14 an exploded view without the outer housing of the auxiliary interrupter chamber according to FIG. 13.

In FIG. 14, the auxiliary interrupter chamber 31 is depicted without an outer housing and in an exploded view. The sliding-type actuating element 34 is arranged such that the counter-contact element 9 is in electrical contact with two mutually opposing switching contact elements 4. The construction of the switching contact elements 4 is analogous to that of the switch 1 described above. It can also be seen that a total of two switching contact elements 4 are arranged on each side of the auxiliary interrupter chamber 31 and are held by the contact element cover 12 as a side wall 38 of the auxiliary interrupter chamber 31. Differently oriented arrangements of the switching contact elements 4 are also possible in the auxiliary interrupter chamber 31 (see the left-hand side in FIG. 14 and the right-hand side in FIG. 14). On the left, the switching contact elements 4 are oriented in such a way that the corresponding clamping screw 14 is accessible from above in the direction of a lid 63 of the auxiliary interrupter chamber 31. On the right-hand side, the switching contact elements 4 are held in an arrangement rotated by 180°, in which the clamping screws 14 are accessible from below, i.e. from a base plate 39.

Analogously to the base plate 7 of the switch 1, the base plate 39 of the auxiliary interrupter chamber 31 is also connected to the remaining parts of the auxiliary interrupter chamber 31 by, for example, friction welding. A corresponding housing of the auxiliary interrupter chamber 31 is shown in FIG. 13. In addition, it is also true according to FIG. 14 that the corresponding contact element covers 12 can be latched to the remaining housing of the auxiliary interrupter chamber 31 (see the corresponding latching projections 52 at the bottom and at the top of the side walls 38).

Holding arms 62 are provided on an inner side of each side wall 38, which can also be arranged analogously in the case of the contact element cover 12 of the switch 1. These serve for different height arrangements of the various switching contact elements and for captively holding the corresponding clamping screws 14.

The base plate 39 likewise has bearing clips 40 which, however, are formed according to FIG. 14 for receiving two contact pins in order to be able to arrange corresponding contact pairs 32, 33. Depending on the vertical adjustment of the corresponding plunger 61, the counter-contact element 9 is arranged with the lower contact pair 33, upper contact pair 32 or in a central position between the contact pairs 32, 33.

Figure 15:
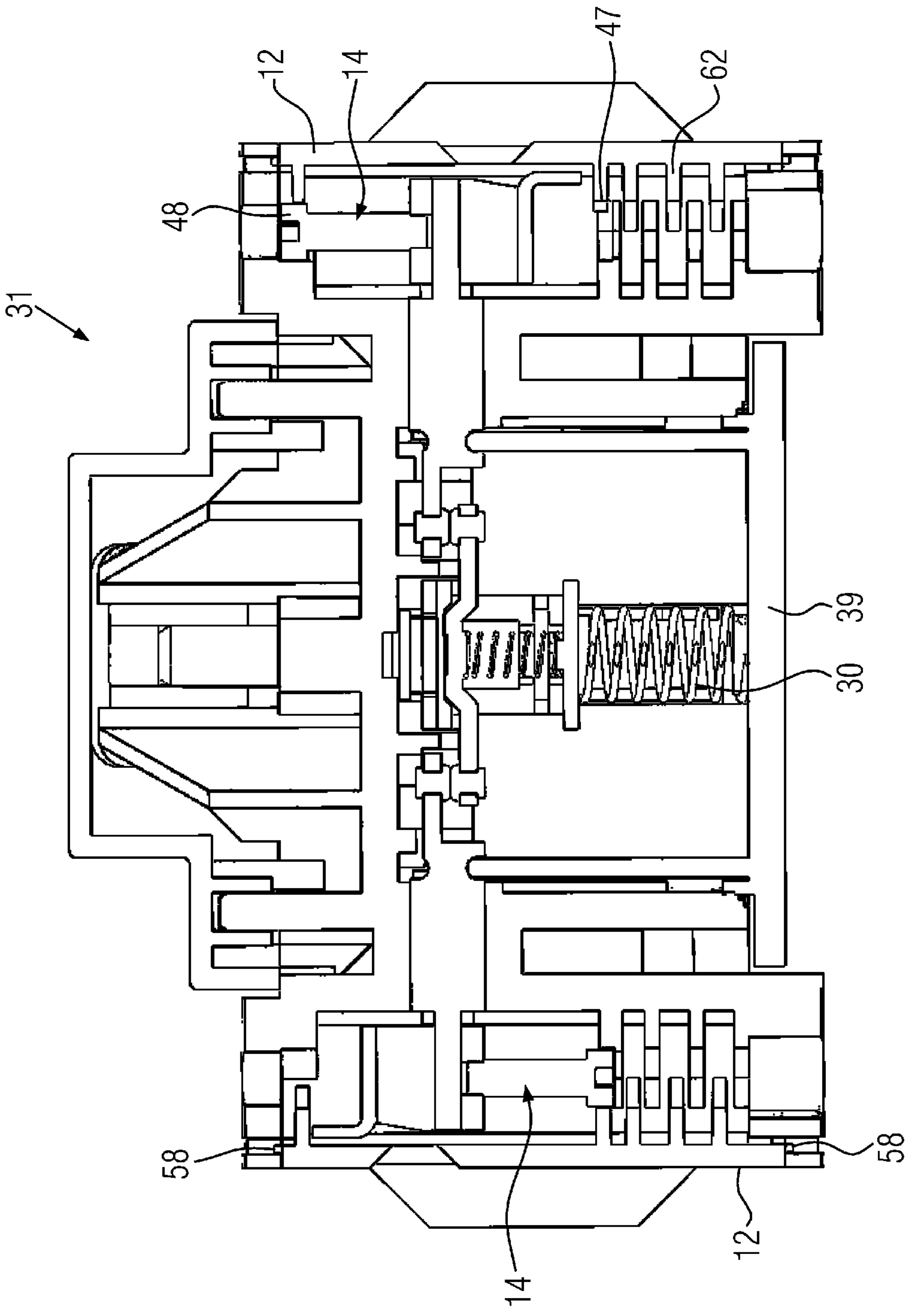
FIG. 15 a side view in section of an auxiliary interrupter chamber according to FIG. 13.

FIG. 15 shows a representation analogous to FIG. 14 in which the side walls 38 are latched (see the tabs or latching projections 58). In this case, only the upper contact pair 32 according to FIG. 14 is visible, while the lower contact pair 33 is covered by corresponding partition walls 43 (see also FIG. 16). This serves for explosion protection.

The corresponding switching contact elements 4 are arranged in different orientations to the left and right (see in particular the orientation of the clamping screws 14). The corresponding holding arms 62 serve for captively retaining the clamping screw 14 in that they have a retaining projection 44 (see also FIG. 18) which in particular at least partially overlaps a screw head 48. That is, although the clamping screws can be released for the purpose of inserting a cable connection for connection to the switching contact elements 4, they are only released until there is corresponding contact with the retaining projection 44.

Figure 16:
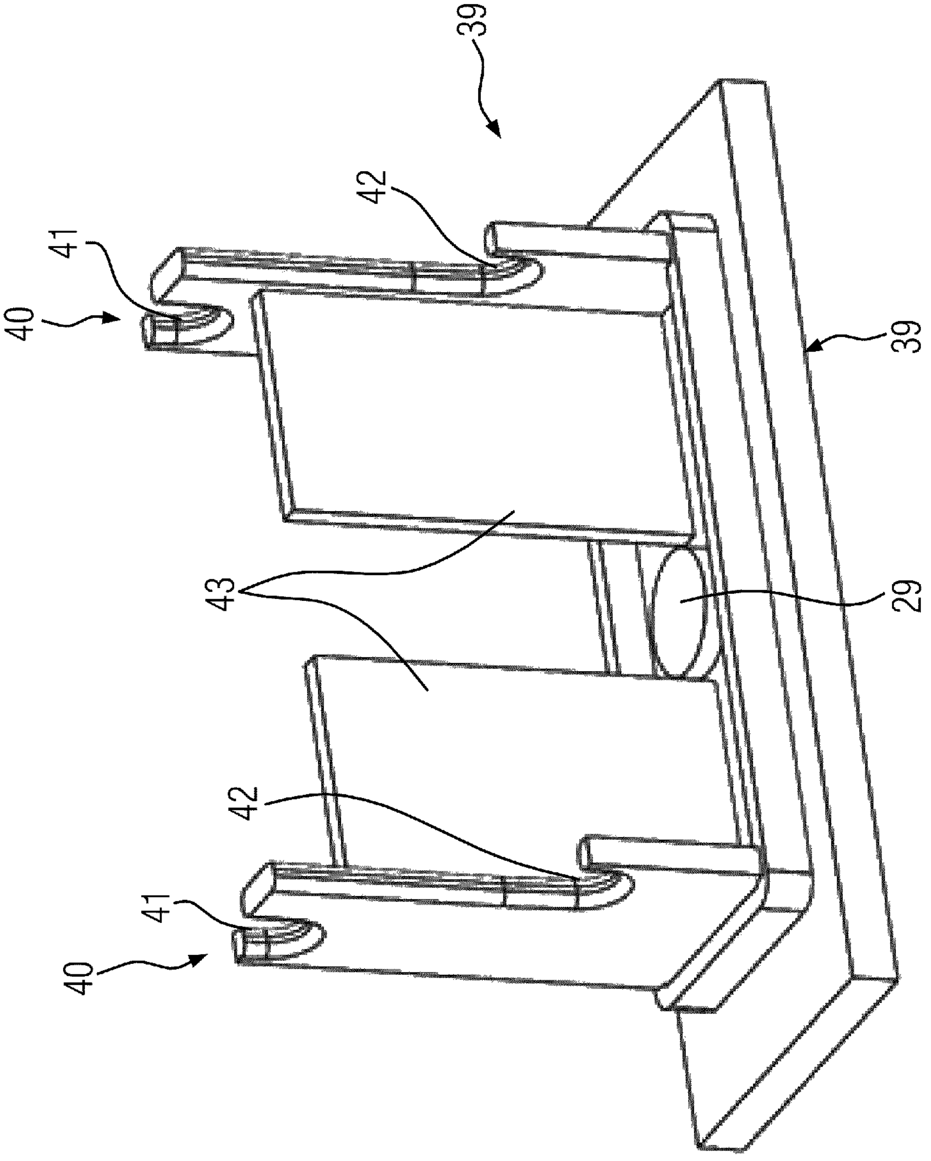
FIG. 16 a perspective side view of a base plate of an auxiliary interrupter chamber.

The corresponding base plate 39 of the auxiliary interrupter chamber 31 is shown in FIG. 16. This is constructed similarly to the base plate 7 of the individual interrupter chambers 3. However, the bearing clips 40 have two contact pin receptacles 41, 42, by means of which a part of the corresponding contact pairs 32, 33 or associated contact pins 17 is held in an analogous way to the previous embodiments. The contact pin receptacles 41, 42 are arranged at different heights, wherein partition walls 43 are arranged between the bearing clips 40 and also between the contact pin receptacles 41, 42. These extend approximately from the bearing clips 40 to the spring receiving opening 29. Analogously to the spring-receiving opening in the individual interrupter chambers, this serves for supporting a spring element 30 acting on the plunger 61 by spring-loading.

The further embodiments regarding the bearing groove 24 and bearing clip 25 in connection with the individual interrupter chambers also apply to the bearing clips 40 and contact pin receptacles 41, 42 in the case of the auxiliary interrupter chamber 31.

Figure 17:
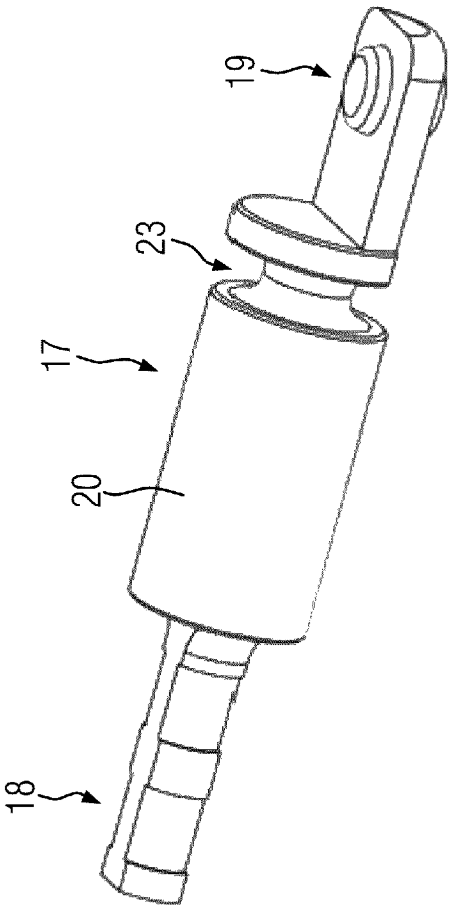
FIG. 17 a perspective side view of a contact pin of an auxiliary interrupter chamber.

FIG. 17 shows a corresponding contact pin 17 of the auxiliary interrupter chamber 31. This is constructed similarly to the contact pin 17 of the individual interrupter chamber 3. Here as well, a gap cylinder 20 with a laterally adjacent bearing groove 23 is provided approximately centrally. The contact end 19 then adjoins the bearing groove 23 and the insertion end 18 adjoins the gap cylinder 20 at the other end. However, the insertion end 18 does not have a square cross-section throughout, but also at least two portions with a reduced cross-section.

Figure 18:
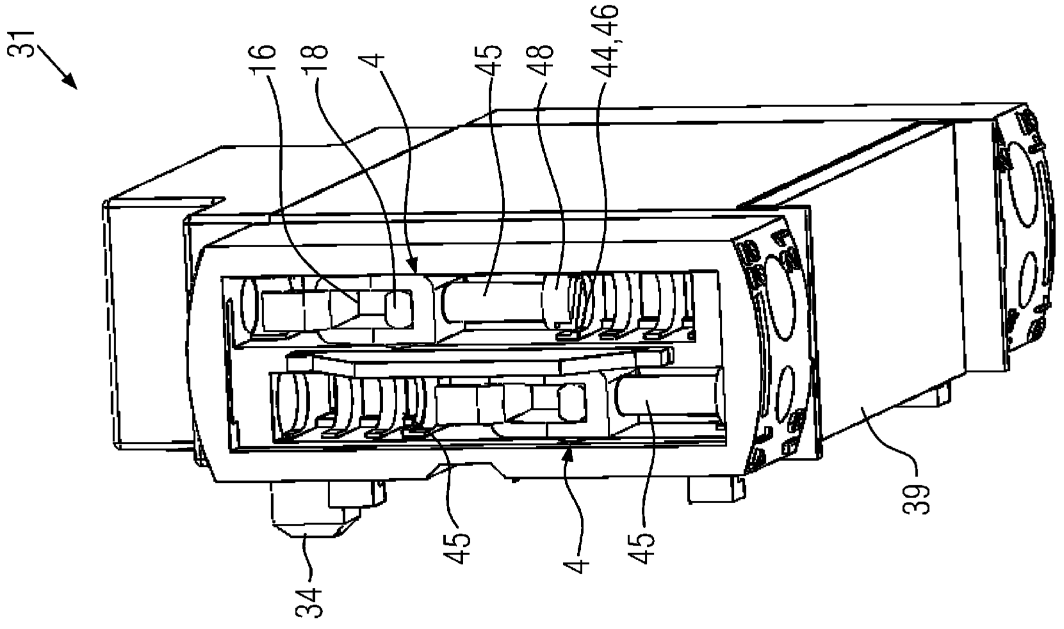
FIG. 18 a perspective side view of an auxiliary interrupter chamber with two side-by-side switching contact elements.

FIG. 18 shows a perspective side view of an auxiliary interrupter chamber 31. In particular, the arrangement of the switching contact elements 4 is shown. In the exemplary embodiment shown, these are both arranged with the same orientation but at a height offset from each other. That is, the corresponding clamping screws 45 are both accessible from below, in other words, from the base plate 39. Furthermore, the corresponding insertion end 18 of the contact pins 17 is visible in the corresponding receiving opening 16. The clamping screws 45 are held at their screw head 48 by the retaining projection 44 as a corresponding edge projection, wherein this edge projection 46 is supplemented by an edge projection 47 (see FIG. 15 and side wall 38). That is, through the interaction of the edge projections 46, 47, the screw head 48 is partially overlapped radially from the outside, so that the clamping screw 48 is arranged captively. Corresponding openings 67, 68 are also visible in FIG. 18 by means of which the corresponding clamping screws can be accessed either from above or from below, depending on the arrangement of the switching contact elements or of the corresponding terminal 66.

Figure 19:
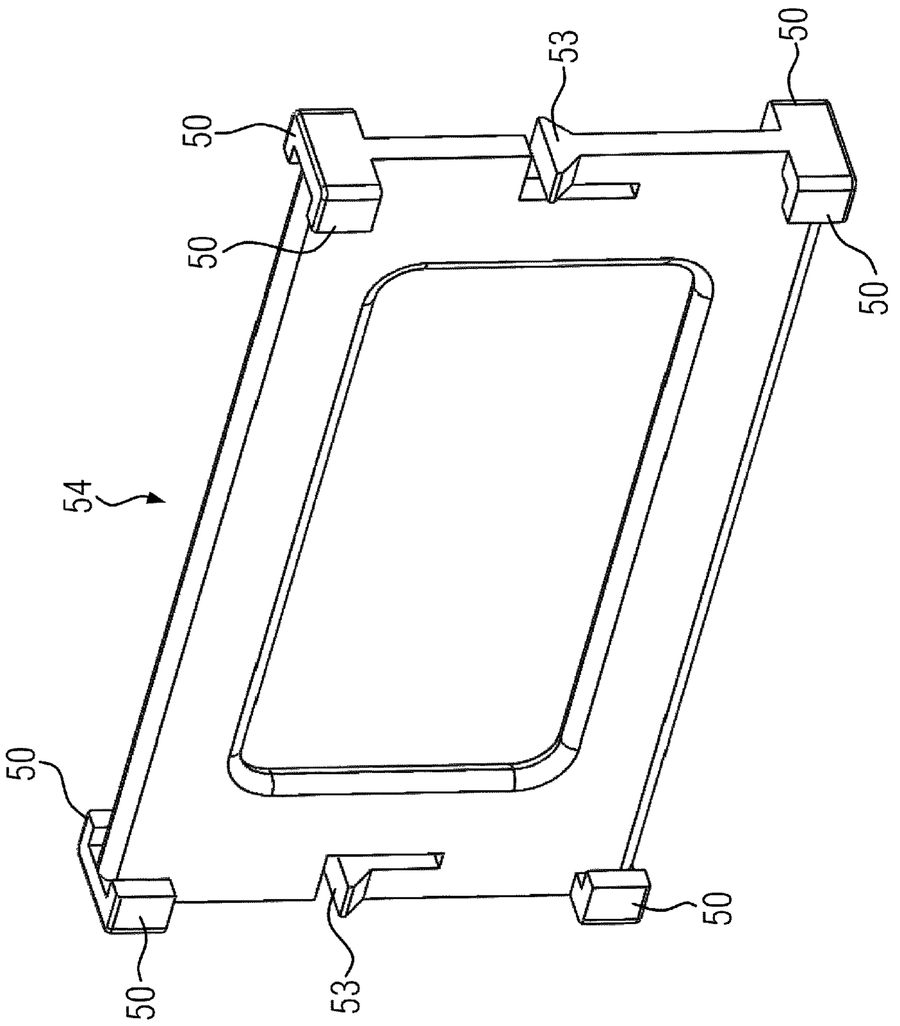
FIG. 19 a perspective side view of a coupling frame part.

It has already been pointed out that different switches or also switches and auxiliary interrupter chambers can be connected to each other. This can be effected directly by means of corresponding auxiliary means (see the preceding embodiments) or via a coupling frame part 54, which is visible in FIG. 19 in a perspective side view. The coupling frame part 54 has corresponding connecting elements along its side edges. An upper connecting element is, for example, a push-on arm 50, which projects beyond the coupling frame part 54 on both sides. A lower connecting element is another push-on arm 50, which is formed analogously to the upper push-on arm. A latching arm 53 is arranged in the height direction 51 between the two push-on arms 50. This projects beyond the coupling frame part 54 on both sides and is used for latching with a corresponding latching projection 52 (see also FIG. 20) on the switch housing 2 or on the auxiliary interrupter chamber 31. The push-on arms 50 are used to slide onto the L-shaped sliding arms 35 or L-shaped push-on projections 49 (see the following and preceding embodiments).

That is, one side of the coupling frame part 54 is, for example, assigned to one side of the switch housing 2 of a switch 1 and fastened there, while the other side of the coupling frame part 54 serves to fasten a further switch housing or also an auxiliary interrupter chamber 31. The coupling frame part 54 can also be used for connecting two auxiliary interrupter chambers 31.

Figure 20:
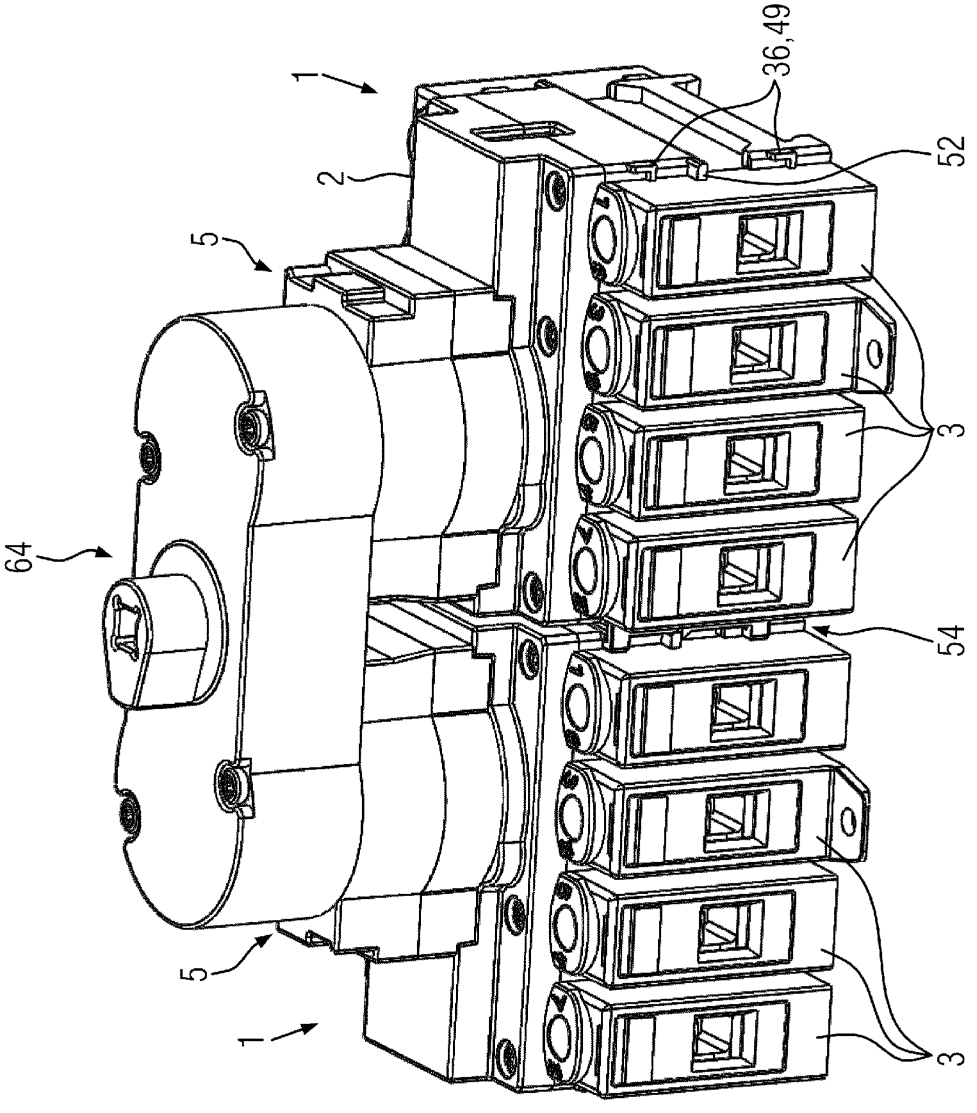
FIG. 20 a switch with two switch housings and a coupling frame part between them.

In FIG. 20, two switches 1 are arranged side by side, wherein each switch 1 has a corresponding switch housing and a number of individual interrupter chambers 3. The coupling frame part 54 is arranged between the two switch housings 2. Arranged above the switch housings 2 in each switch 1 is a corresponding actuating device 5, on which a collective actuating device 64 for simultaneous and analog actuation of the actuating devices 5 is arranged. Each switch 1 is structured as already explained above. It can also be seen in FIG. 20 that, on the free side faces of the switch housing 2, corresponding devices are formed for the attachment of a further switch or also of an auxiliary interrupter chamber 31; see push-on sections 36 in the form of L-shaped push-on projections 49. In addition, a latching projection 52 is arranged correspondingly between them. The orientations of the actuating devices 5 are here rotated by 180°.

Figure 21:
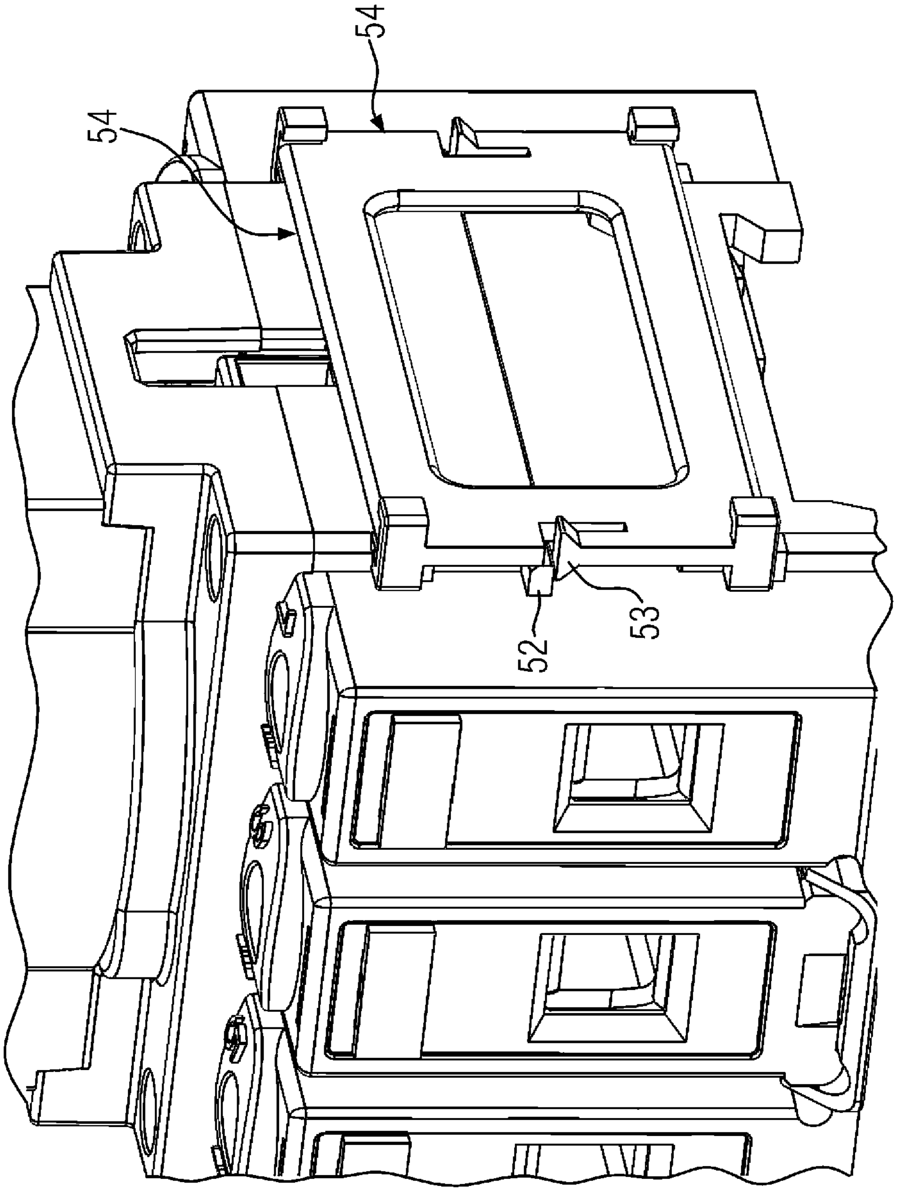
FIG. 21 a switch with a laterally arranged coupling frame part.

In FIG. 21, a corresponding coupling frame part 54 is arranged on one side of a switch 1. This is in its latched position, since the latching arm 53 engages beneath the latching projection 52.

Figure 22:
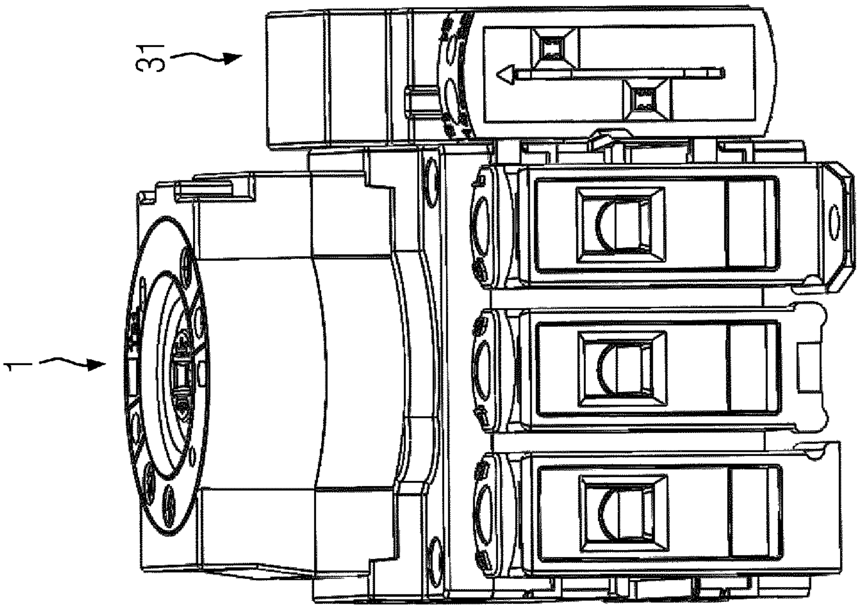
FIG. 22 a switch with laterally arranged auxiliary interrupter chamber.

In FIG. 22, an auxiliary interrupter chamber 31 is directly connected to a side face of a switch 1, wherein the corresponding connecting elements are used here as well (see push-on projection, push-on arm, latching projection and latching arm). In this connection, there is still the possibility for a coupling frame part 54 to be arranged between the auxiliary interrupter chamber 31 and the ganged cam switch 1 in order, for example, to increase the distance between the two.

Figure 23:
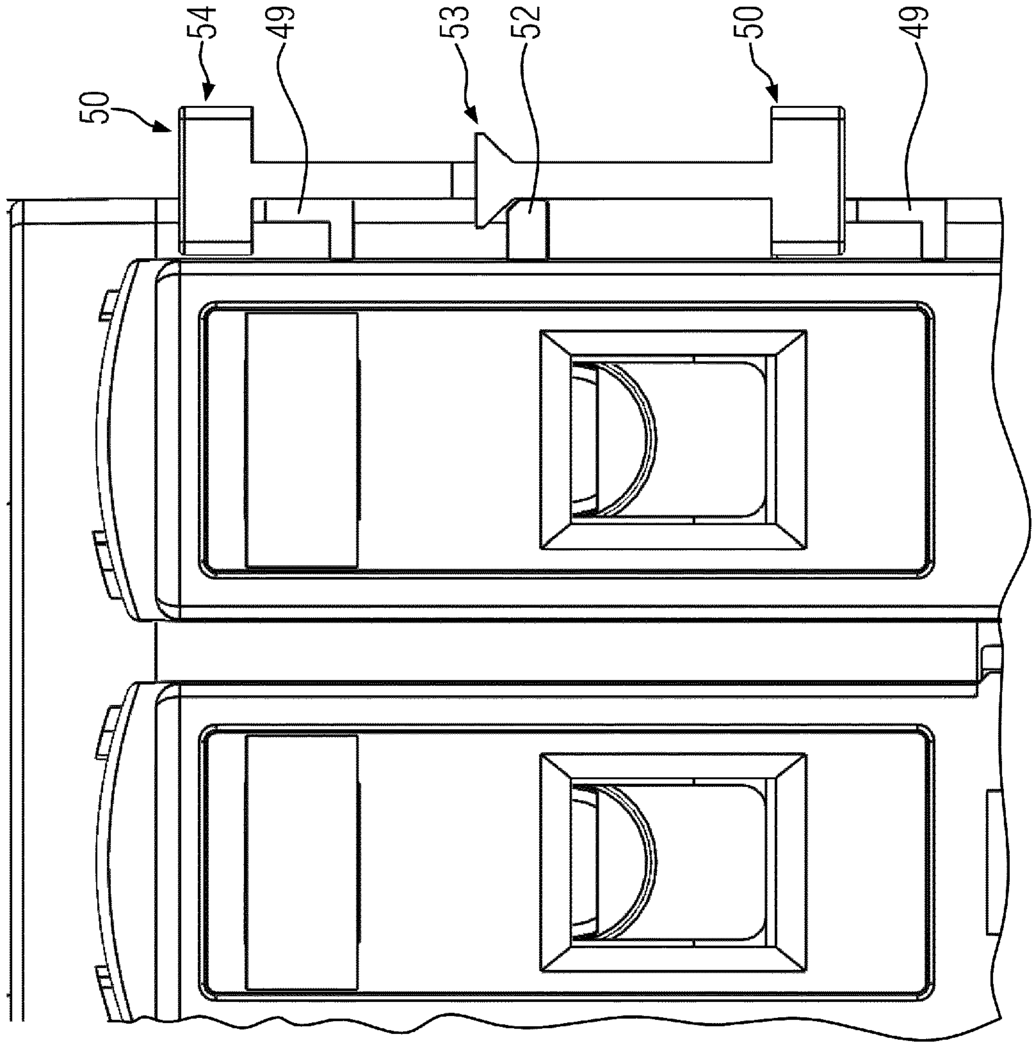
FIG. 23 a side view of a switch with coupling frame part in the release position.

In FIG. 23, a coupling frame part 54 is arranged in its as yet unconnected position. That is, the L-shaped push-on projections 49 are still exposed and the latching arm 53 is not yet engaging beneath the latching projection 52.

Figure 24:
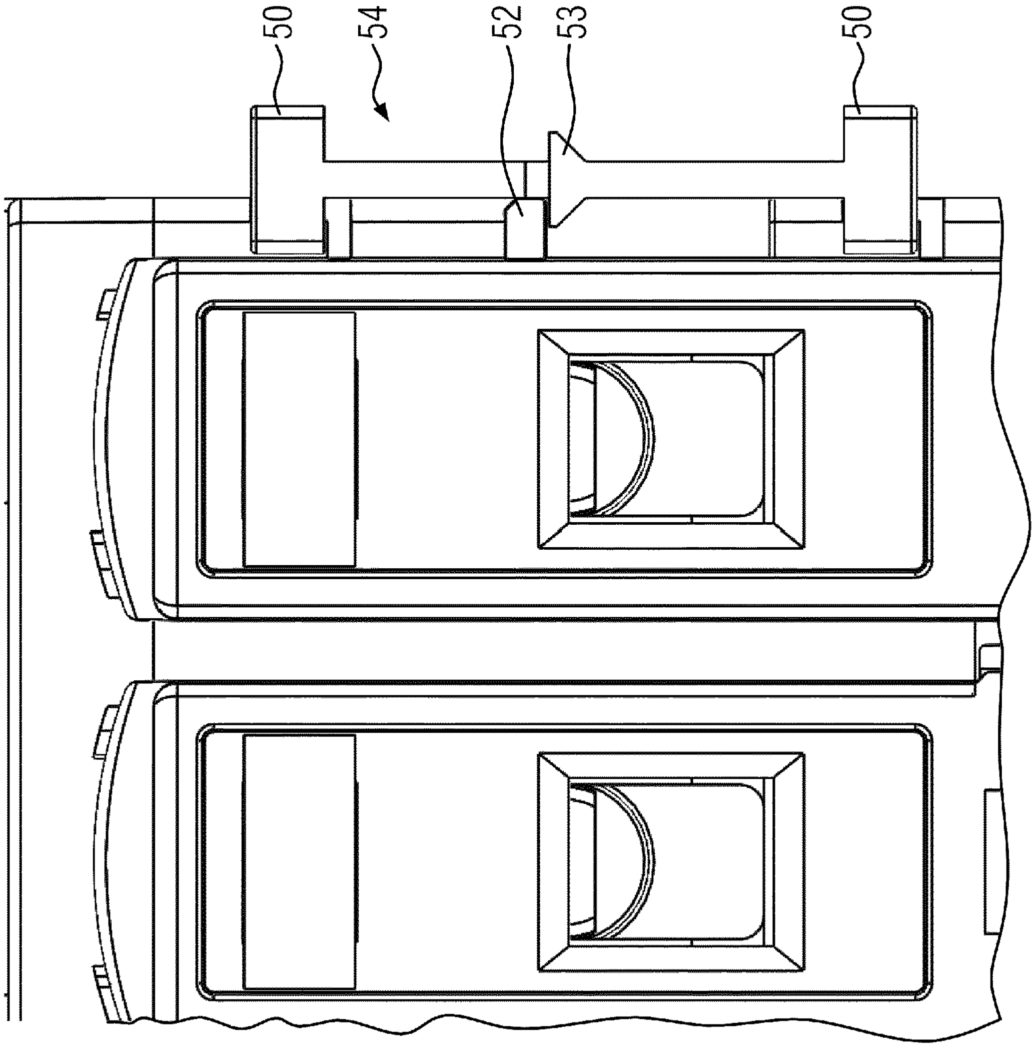
FIG. 24 a view analogous to FIG. 23 with a coupling frame part in the connecting position.

In FIG. 24, the coupling frame part 54 is then in its fastened state, and in particular the latching arm 53 engages beneath the latching projection 52. The side of the coupling frame part 54 shown on the right in FIG. 24 can then serve for attaching a further switch housing 2 of a switch 1 (see FIG. 20) or for holding an auxiliary interrupter chamber 31.

Figure 25:
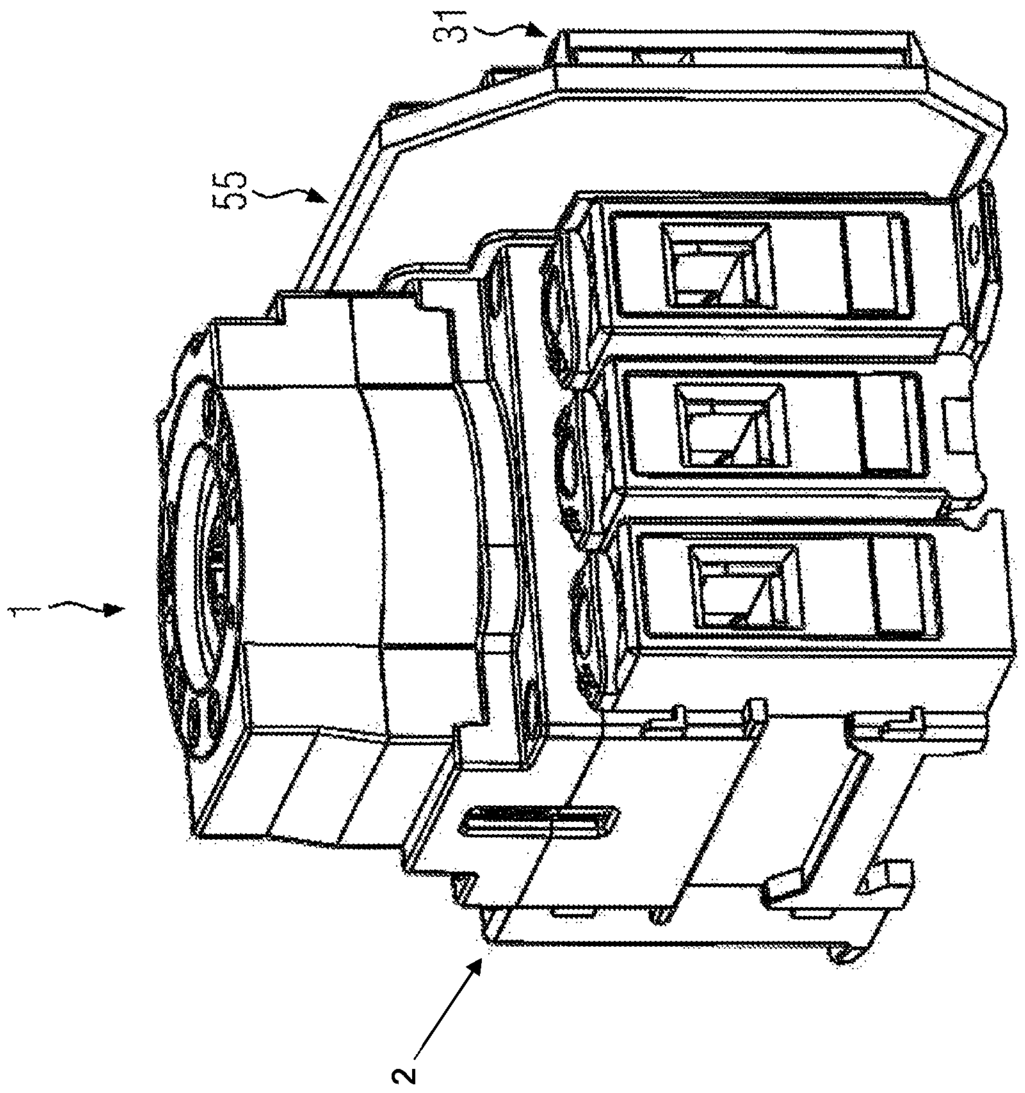
FIG. 25 a switch with a laterally arranged partition plate and auxiliary interrupter chamber.

FIG. 25 shows a switch 1 according to the preceding exemplary embodiments, wherein this switch has a partition plate 55 on one side, on the other side of which an auxiliary interrupter chamber 31 is arranged. This partition plate serves essentially as an Ex-i partition plate between switch 1 and auxiliary interrupter chamber 31.

Figure 26:
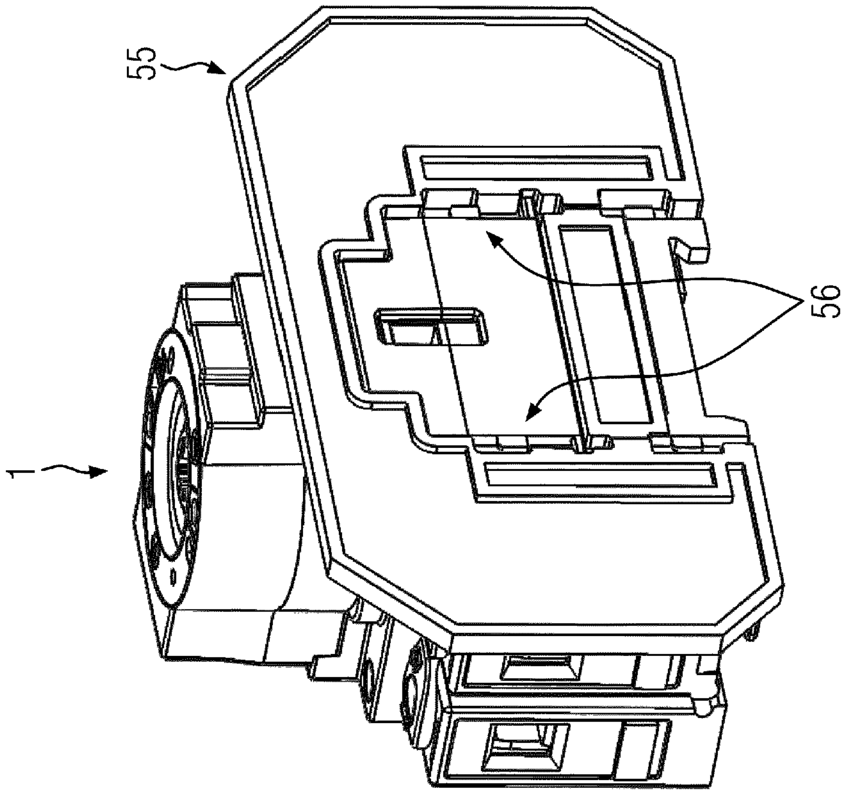
FIG. 26 a side perspective view of a partition plate on a switch.
Figure 27:
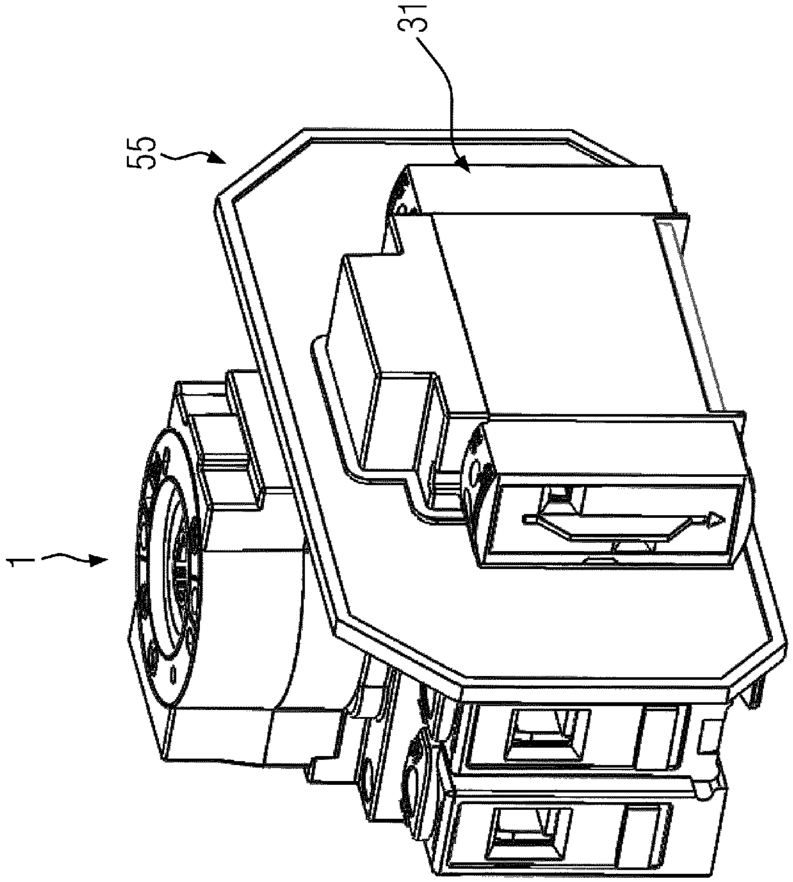
FIG. 27 a representation analogous to FIG. 25 from another viewpoint.

FIG. 26 shows the partition plate 55 without a corresponding auxiliary interrupter chamber 31 as shown in FIG. 25. An open inner contour 56 which does not cover the corresponding connecting elements on the switch housing 2 of the switch 1 can be seen, so that (see FIG. 27) an auxiliary interrupter chamber 31 can be attached in the already described manner via L-shaped push-on projections, push-on arms, latching projection and latching arm. The corresponding partition plate 55 projects at least laterally and upwardly beyond the auxiliary interrupter chamber 31 and separates it from the switch housing 2 of the switch 1.

Figure 28:
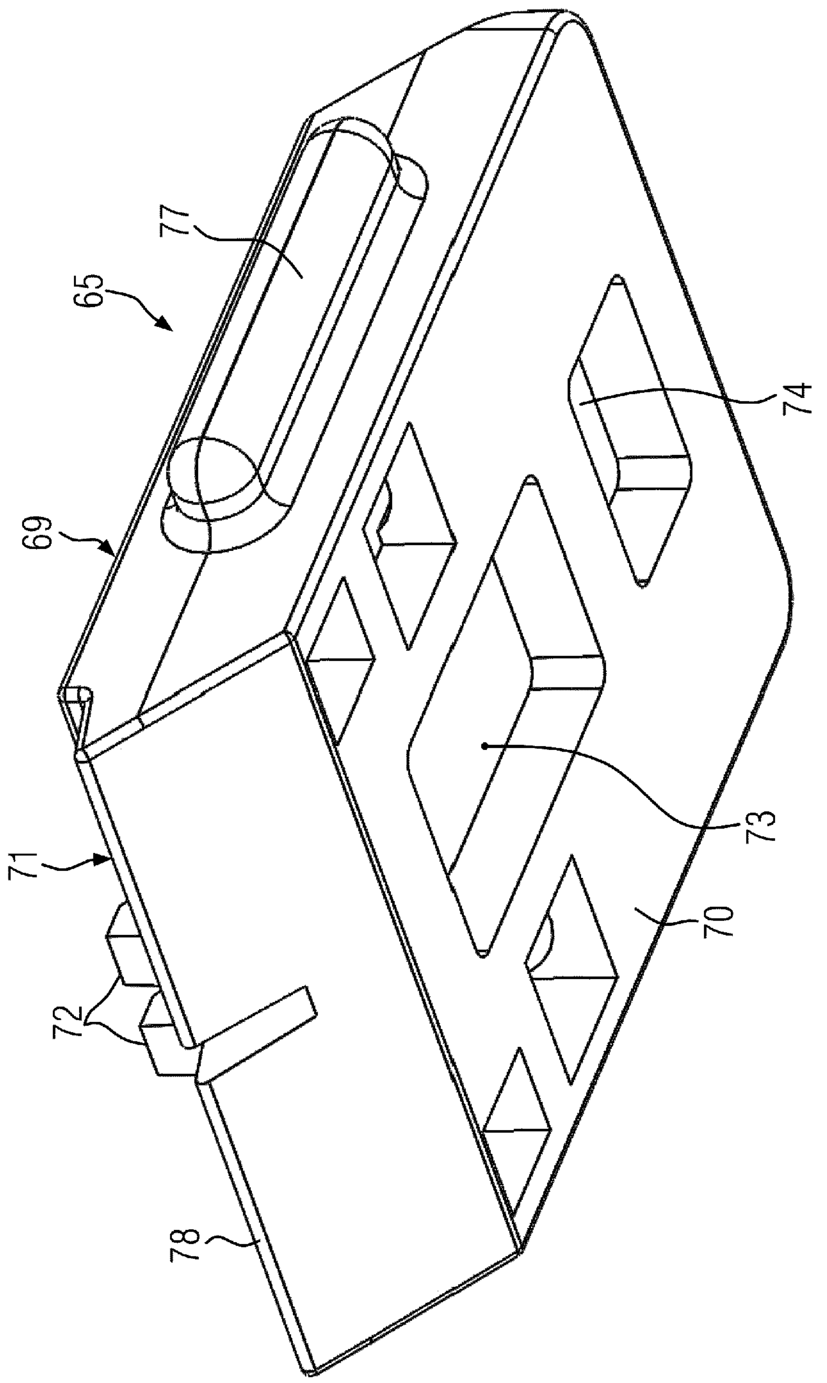
FIG. 28 a top perspective view of a latching device for attaching the switch to a DIN rail.

FIG. 28 shows a perspective view of a latching device 65, which is adjustably mounted on the base plate and/or on the switch housing. The corresponding latching direction is also visible, for example, in FIG. 3. The latching device 65 is essentially formed as a snap-on latch, which is displaceably mounted relative to, for example, the base plate 7 (see again FIG. 3) by means of lateral guide projections 77. The latching device 65 has an upper side 69 and a lower side 70, wherein the upper side 69 is associated with the base plate 7. At one end, the latching device has a latching end 71 with a latching nose 78. This serves to fasten the switch to a DIN rail or the like. In addition, stops 72 are arranged on the upper side 69, which limit an engagement of the latching nose 78 relative to a DIN rail (not shown). The locking device has a number of openings, one opening 73 of which is in each case assigned to a corresponding opening 67, 68 of an individual interrupter chamber 3. That is, even when a snap-on latch is present, the corresponding clamping screws are accessible via opening 73 and openings 67, 68. The snap-on latch has at least one further opening 74 adjacent its end opposite the latching nose 78. This opening 74 serves in particular for the insertion of a tool or the like, in order to pull the snap-on latch out of engagement with the DIN rail.

Figure 29:
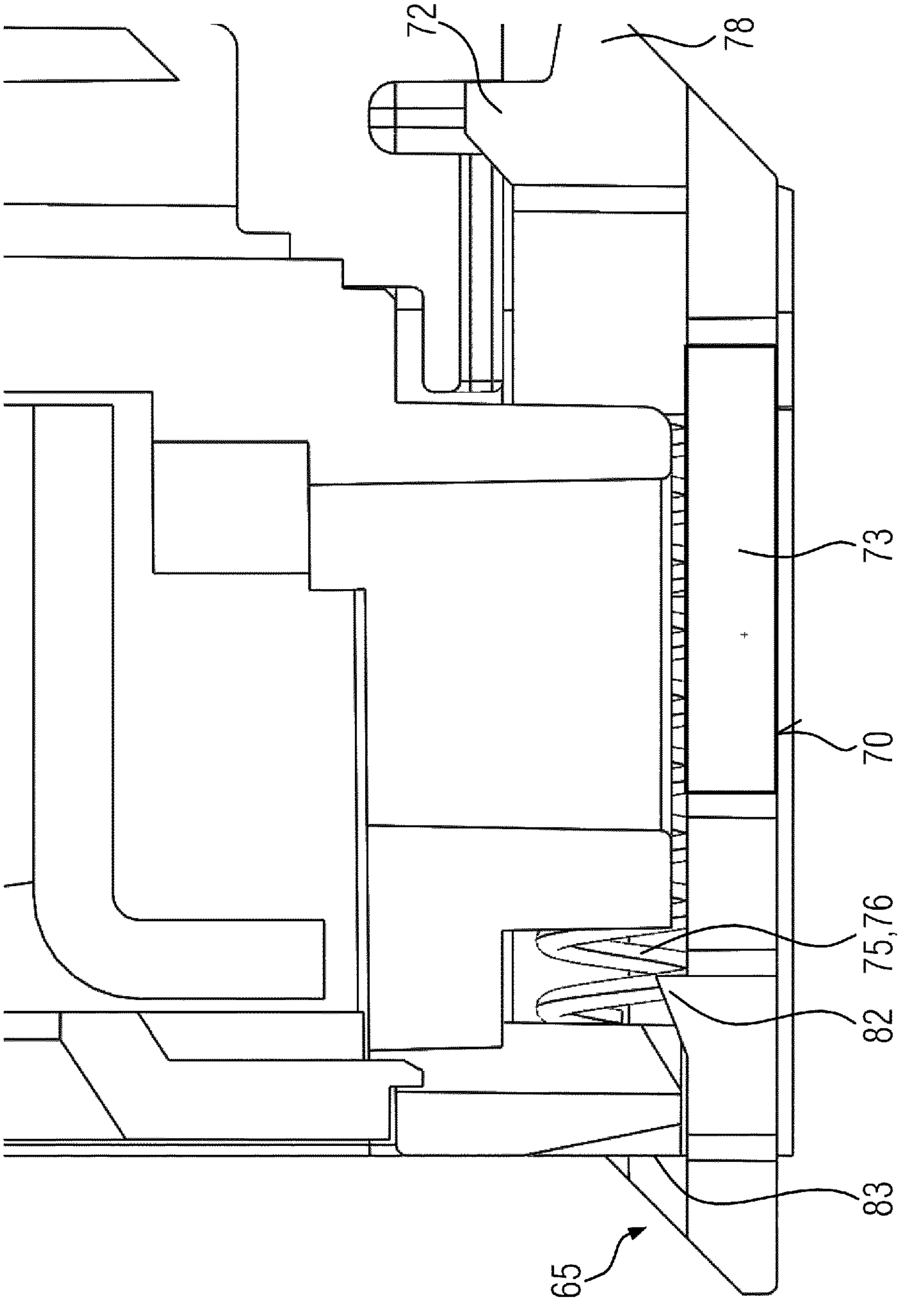
FIG. 29 a partially sectional illustration of the latching device in the assembled state.
Figure 30:
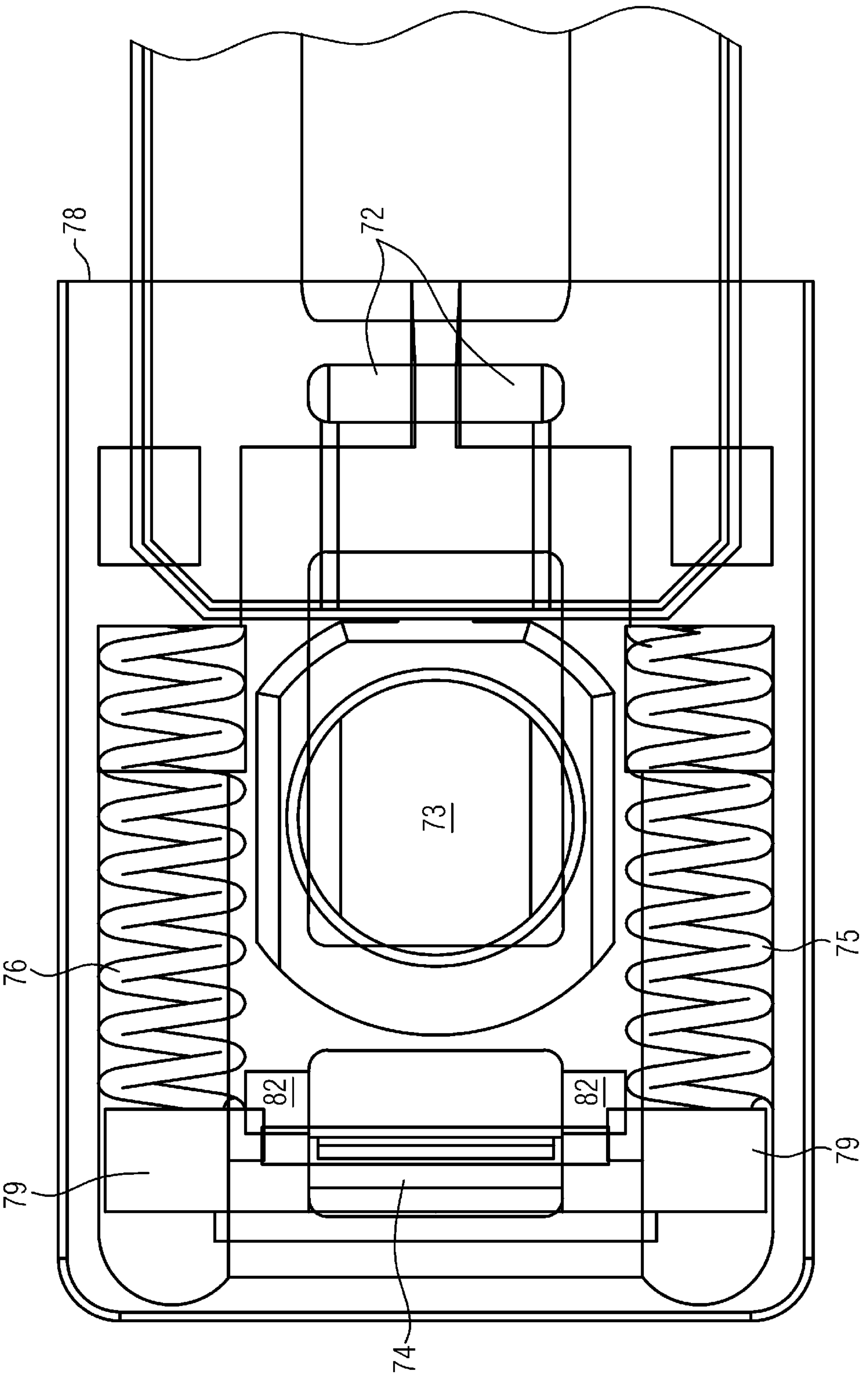
FIG. 30 a transparent representation of the latching device in plan view.

Two spring elements 75, 76 are mounted at a distance from each other in the snap-on latch 65 (see also FIG. 30). These (see also FIG. 29) are supported, for example, on a contact element cover 12 or within the switch housing 2, in order to push the snap-on latch in the direction of the DIN rail. A corresponding engagement of the snap-on latch is limited by abutment of the stops 72 in particular against the base plate 7. This corresponding position is shown in FIG. 29. That is, in FIG. 29 the snap-on latch is arranged in its engaged position with a DIN rail (not shown). By means of the opening 74, the snap-on latch can be displaced to the left from the position shown in FIG. 29, so that disengagement from the DIN rail is achieved (disconnected position). In order to be able to set the disconnected position, at least one latching hook 82 projects from in particular the upper side 69 of the latching device 65. When the locking device is in its disconnected position, i.e. is not in engagement with a corresponding rail, this disconnected position relative to an outer side 83 is defined by the at least one latching hook. The latching hook can likewise be formed in pairs, in particular on both sides of the further opening 74 on the upper side. The latching device is therefore automatically held open in the disconnected position. The switch housing can thereby be positioned in a simple manner relative to the DIN rail. When the desired position has been reached, the latching between latching hook and switch housing 2 or contact element cover 12 can be released by slight pressure on the latching device, in particular downwardly or at least obliquely downwardly. The snap-on position is then automatically assumed by the spring elements.

FIG. 30 shows the corresponding stops 79 of the switch, on which the spring elements 75 and 76 are supported, leaving the opening 73 free.

According to the invention, a switch with a number of individual chambers for each contact results. The switch is suitable for housing installation or front-panel mounting due to the different orientation possibilities of the corresponding switching contact elements. That is, it can be arranged in different positions in a simple manner without complicated measures, wherein the switch is of modular design (see the individual interrupter chambers and the switching contact elements) and these can be oriented differently depending on the mounting of the switch. The corresponding switching contact elements are not glued or potted, but are arranged in a manner detachable and differently orientable in the particular individual interrupter chamber 3. The corresponding base plate is fastened from below to each individual interrupter chamber and in particular is welded there.

The corresponding contact element covers can also be used easily for each individual interrupter chamber. No further components are necessary for the different orientations, in particular the switching contact elements, but individual interrupter chambers and also contact element covers are provided for both orientations.

In addition, in the present application, it is also possible to orient the actuating device differently for left-handed or right-handed operation or in accordance with FIGS. 1, 2 and 20. The auxiliary interrupter chamber is a separate component which can be used both independently and together with the switch according to the invention. The auxiliary interrupter chamber has two pairs of switching contact elements which essentially correspond to the structure of the individual interrupter chambers of the switch; see the different orientations of the switching contact elements, the different orientation of the side wall or contact element cover. Although the switching contact elements and in particular their contact pins are rotatable, they are held in a manner longitudinally displaceable for each switching contact element.

The invention claimed is:

1. A switch comprising:

a switch housing:

individual interrupter chambers arranged next to each other in the switch housing in a modular manner, wherein each individual interrupter chamber includes at least two switching contact elements; and an actuating device closing off the switch housing above the individual interrupter chambers and provided for adjusting a cam element for selective establishment of each electrical connection between the switching contact elements of each individual interrupter chamber, wherein the switching contact elements can be arranged in an explosion-proof manner in each individual interrupter chamber in at least two different orientations, and in particular the cam element of the actuating device can be arranged differently depending on the orientation of the switching contact elements, wherein each switching contact elements has a contact pin having an insertion end, a contact end opposite the insertion end, and a receiving opening for the insertion end of the contact pin, the contact end being in contact with a counter-contact element in a contact position.

2. The switch according to claim 1, wherein the individual interrupter chambers are covered and closed off via at least one base plate connected to the switch housing.

3. The switch according to claim 2, wherein the connection between the switch housing and the base plate is made gas-tight.

4. The switch according claim 2, wherein each of the at least one base plate has two bearing clips projecting in a direction toward the contact pins.

5. The switch according to claim 2, wherein the base plate has a spring-receiving opening for a spring element which acts on the counter-contact element in a force-applying manner.

6. The switch according to claim 1, wherein the actuating device has a rotary positioning drive which linearly adjusts the cam element, wherein the cam element has an underside facing the switching contact elements for adjusting the counter-contact element between the contact position and a disconnected position.

7. The switch according to claim 1, wherein each individual interrupter chamber has a contact element cover connected to the individual interrupter chamber in accordance with the orientation of the switching contact elements.

8. The switch according to claim 7, wherein each contact element cover has a rounded supporting surface for a clamping screw of an associated switching contact element.

9. The switch according to claim 7, wherein each contact element cover has a lateral insertion opening for the arrangement of a plug-in identification plate.

10. The switch according to claim 1, each contact pin has a gap cylinder, wherein a puncture-proof gap is formed between the gap cylinder and an edge of the receiving opening of each contact pin.

11. The switch according to claim 9, wherein a bearing groove for longitudinally fixing each contact pin is formed between the gap cylinder and the contact end of each contact pin.

12. The switch according to claim 1, further comprising an auxiliary interrupter chamber arranged laterally on the switch housing, wherein the auxiliary interrupter chamber has at least two contact pairs.

13. The switch according to claim 12, wherein the auxiliary interrupter chamber has on each side wall two switching contact elements with contact pins.

14. The switch according to claim 12, wherein the auxiliary interrupter chamber has a base plate with bearing clips, wherein each bearing clip has two U-shaped contact pin receptacles, and wherein at least one partition wall is formed between the bearing clips.

15. The switch according to claim 14, wherein side walls of the auxiliary interrupter chamber have retaining projections in a region of the switching contact element that holds clamping screws of the switching contact elements.

16. The switch according to claim 1, further comprising a coupling frame part configured to be arranged between two adjacent switch housings or between a switch housing and an auxiliary interrupter chamber, the coupling frame part having push-on arms and/or latching arms on both sides.

17. The switch according to claim 1, further comprising a partition plate configured to be arranged between a switch housing and an auxiliary interrupter chamber, wherein the partition plate has an open inner contour through which a connection can be established between the switch housing and the auxiliary interrupter chamber.

18. The switch according to claim 1, further comprising a latching device adjustably mounted on the switch housing.

19. The switch according to claim 1, wherein the switch housing has an upper opening and a lower opening through which a corresponding clamping screw is accessible from outside of the switch housing.

* * * * *